US012567051B2

(12) United States Patent
Storiale et al.

(10) Patent No.: US 12,567,051 B2
(45) Date of Patent: Mar. 3, 2026

(54) SECURE POINT OF SALE (POS) OPERATIONS

(71) Applicant: Synchrony Bank, Stamford, CT (US)

(72) Inventors: Michael Storiale, Stamford, CT (US); Lisa Hammond, Stamford, CT (US); Jake Miller, Stamford, CT (US); Paul Rowe, Denver, CO (US); Tiffanie Terry, Charlotte, NC (US); Denys Iakimov, Stamford, CT (US); Daniel Sapio, Charlotte, NC (US); Bakhadir Rakhmatov, Stamford, CT (US); Patrick Joseph Caraher, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 337 days.

(21) Appl. No.: 17/731,857

(22) Filed: Apr. 28, 2022

(65) Prior Publication Data

US 2022/0351170 A1     Nov. 3, 2022

Related U.S. Application Data

(60) Provisional application No. 63/182,116, filed on Apr. 30, 2021.

(51) Int. Cl.
G06Q 20/20 (2012.01)
G06Q 20/32 (2012.01)
(Continued)

(52) U.S. Cl.
CPC ......... G06Q 20/206 (2013.01); G06Q 20/322 (2013.01); G06Q 20/38215 (2013.01);
(Continued)

(58) Field of Classification Search
CPC .............. G06Q 20/206; G06Q 20/322; G06Q 20/38215; G06Q 20/4016; G06Q 20/202;
(Continued)

(56) References Cited

U.S. PATENT DOCUMENTS 11,948,140 B1 *   4/2024   Spitzer ............... G06Q 20/3223
2017/0308900 A1 *   10/2017   Kohli ................. G06Q 20/4016
(Continued)

OTHER PUBLICATIONS

Chay Fisher, Developments in the Buy Now, Pay Later Market, Mar. 2021, Reserve Bank of Australia Bulletin, pp. 59-71 (Year: 2021).*

*Primary Examiner* — Aaron N Tutor
(74) *Attorney, Agent, or Firm* — Polsinelli LLP

(57) ABSTRACT

Examples presented herein describe secure point of sale (POS) operations. One example is a method including receiving, at a mobile device, a communication associated with a custom tender payment for a secure transaction payment, where the mobile device includes a custom payment application configured for the secure transaction payment with a point of sale (POS) device. The method includes receiving account data associated with a user account selection for the custom tender payment for the secure transaction payment, transmitting an account signal including the account data, where when the account signal is transmitted to an integration server as part of the secure transaction payment, the account signal is not transmitted to the POS device, and receiving an authorization communication, where when the authorization communication is received by the mobile device from the integration server, the authorization communication is not communicated to the mobile device via the POS device.

32 Claims, 17 Drawing Sheets

(51) Int. Cl.
    *G06Q 20/38*      (2012.01)
    *G06Q 20/40*      (2012.01)
    *H04L 9/32*      (2006.01)

(52) U.S. Cl.
    CPC ....... *G06Q 20/4016* (2013.01); *H04L 9/3213*
             (2013.01); *H04L 2209/56* (2013.01)

(58) Field of Classification Search
    CPC . G06Q 20/227; H04L 9/3213; H04L 2209/56;
             H04L 2463/102; H04L 63/0807
    See application file for complete search history.

(56)            References Cited

U.S. PATENT DOCUMENTS

| | | | |
|---|---|---|---|
| 2020/0334347 A1* | 10/2020 | Hoyos | H04L 63/0861 |
| 2021/0165859 A1* | 6/2021 | Damato | G06F 21/128 |
| 2022/0051231 A1* | 2/2022 | Laracey | G06Q 20/20 |
| 2023/0360040 A1* | 11/2023 | Childe | G06Q 20/0655 |

\* cited by examiner

HOST DEVICE 1310

SYSTEM 1320

FIREWALL 1330

GATEWAY 1340

LOAD BALANCE 1350

DEVICE
1351

DEVICE
1352

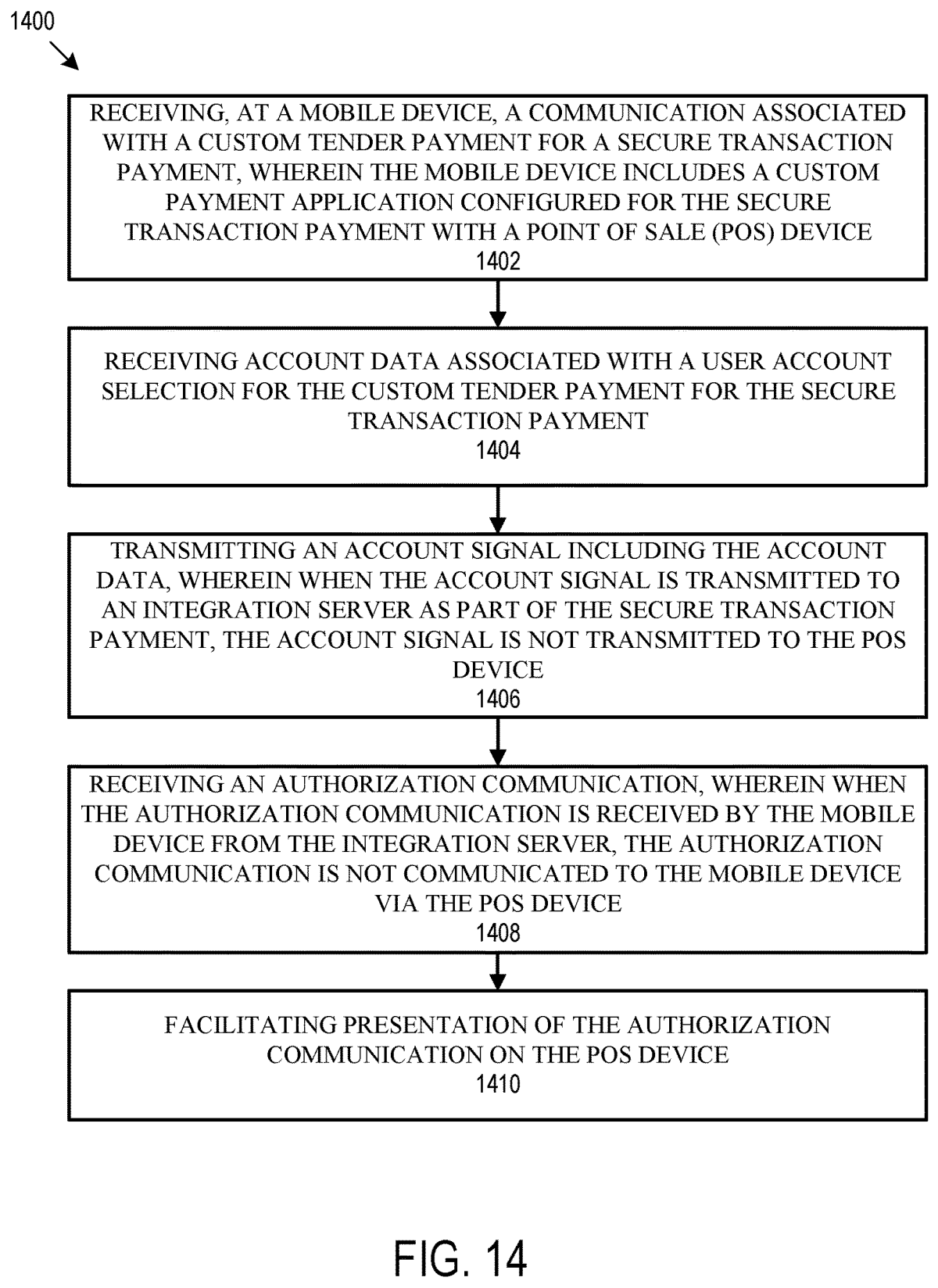

1400

RECEIVING, AT A MOBILE DEVICE, A COMMUNICATION ASSOCIATED WITH A CUSTOM TENDER PAYMENT FOR A SECURE TRANSACTION PAYMENT, WHEREIN THE MOBILE DEVICE INCLUDES A CUSTOM PAYMENT APPLICATION CONFIGURED FOR THE SECURE TRANSACTION PAYMENT WITH A POINT OF SALE (POS) DEVICE
1402

RECEIVING ACCOUNT DATA ASSOCIATED WITH A USER ACCOUNT SELECTION FOR THE CUSTOM TENDER PAYMENT FOR THE SECURE TRANSACTION PAYMENT
1404

TRANSMITTING AN ACCOUNT SIGNAL INCLUDING THE ACCOUNT DATA, WHEREIN WHEN THE ACCOUNT SIGNAL IS TRANSMITTED TO AN INTEGRATION SERVER AS PART OF THE SECURE TRANSACTION PAYMENT, THE ACCOUNT SIGNAL IS NOT TRANSMITTED TO THE POS DEVICE
1406

RECEIVING AN AUTHORIZATION COMMUNICATION, WHEREIN WHEN THE AUTHORIZATION COMMUNICATION IS RECEIVED BY THE MOBILE DEVICE FROM THE INTEGRATION SERVER, THE AUTHORIZATION COMMUNICATION IS NOT COMMUNICATED TO THE MOBILE DEVICE VIA THE POS DEVICE
1408

FACILITATING PRESENTATION OF THE AUTHORIZATION COMMUNICATION ON THE POS DEVICE
1410

FIG. 14

1500

```
┌─────────────────────────────────────────────────────────────┐
│                                                             │
│                          1410                               │
│                                                             │
└─────────────────────────────────────────────────────────────┘
                              │
                              ▼
┌─────────────────────────────────────────────────────────────┐
│      RECEIVING A PAYMENT OPTION COMMUNICATION INCLUDING     │
│    PAYMENT OPTION DATA, WHEREIN WHEN THE PAYMENT OPTION     │
│      COMMUNICATION IS RECEIVED, THE PAYMENT OPTION          │
│  COMMUNICATION IS ASSOCIATED WITH THE INTEGRATION SERVER   │
│              AND THE ACCOUNT SIGNAL                          │
│                         1502                                │
└─────────────────────────────────────────────────────────────┘
                              │
                              ▼
┌─────────────────────────────────────────────────────────────┐
│   FACILITATING PRESENTATION OF THE PAYMENT OPTION DATA      │
│                         1504                                │
└─────────────────────────────────────────────────────────────┘
                              │
                              ▼
┌─────────────────────────────────────────────────────────────┐
│      RECEIVING A PAYMENT SELECTION, WHEREIN THE PAYMENT     │
│  SELECTION INCLUDES AN INDICATION OF A SELECTED OPTION FROM │
│              THE PAYMENT OPTION DATA                         │
│                         1506                                │
└─────────────────────────────────────────────────────────────┘
                              │
                              ▼
┌─────────────────────────────────────────────────────────────┐
│    TRANSMITTING THE PAYMENT SELECTION WHERE THE            │
│   AUTHORIZATION COMMUNICATION IS RECEIVED AFTER            │
│      TRANSMITTING THE PAYMENT SELECTION.                    │
│                         1508                                │
└─────────────────────────────────────────────────────────────┘
```

FIG. 15

SECURE POINT OF SALE (POS) OPERATIONS

CROSS-REFERENCE TO RELATED APPLICATIONS

The present patent application claims the priority benefit of U.S. Provisional Patent Application No. 63/182,116 filed Apr. 30, 2021, the disclosures of which are incorporated by reference herein.

FIELD

The present disclosure relates generally to data security and transactions. In one example, the systems, methods, and other embodiments described herein may be used to implement secure point of sale (POS) operations.

BACKGROUND

Clients often seek to obtain and use credit from a lending institution for a variety of purposes. In some circumstances, a client may interact with a merchant in an environment where the client prefers additional security and protection for the client's data. Managing a transaction in such environments can create barriers to completing transactions between clients, merchants, and lenders. Additionally, mobile platforms are an increasing share of the devices which a client can use to obtain and use credit, and these environments can be leveraged for point of sale (POS) devices. The POS terminal is where the checkout process occurs in both online and in-store purchases, and is usually the last interaction a shopper has with a retailer during a transaction. For some shoppers, the POS terminal is the most important part of the entire shopping experience. If the POS interface is quick, efficient, and pleasant, the customer is more likely to return. Such POS systems can, however, limit certain credit options and present further barriers to transactions for purchase options other than those directly associated with the POS environment (e.g., a mobile environment). Further, other considerations can be involved in such transactions or credit offer operations, such as lender and merchant concerns related to fraud, and regulatory controls on data sharing when the data used in such transactions can be subject to a variety of privacy and regulatory considerations. Such considerations can further create barriers in the context of network communications and data management in a communication system for the data used to facilitate credit options and associated purchase transactions.

BRIEF DESCRIPTION OF THE DRAWINGS

The present disclosure is described in conjunction with the appended figures:

FIG. 14 is a flow diagram illustrating a method in accordance with some examples.

FIG. 15 is a flow diagram illustrating a method in accordance with some examples.

Figure 1A:
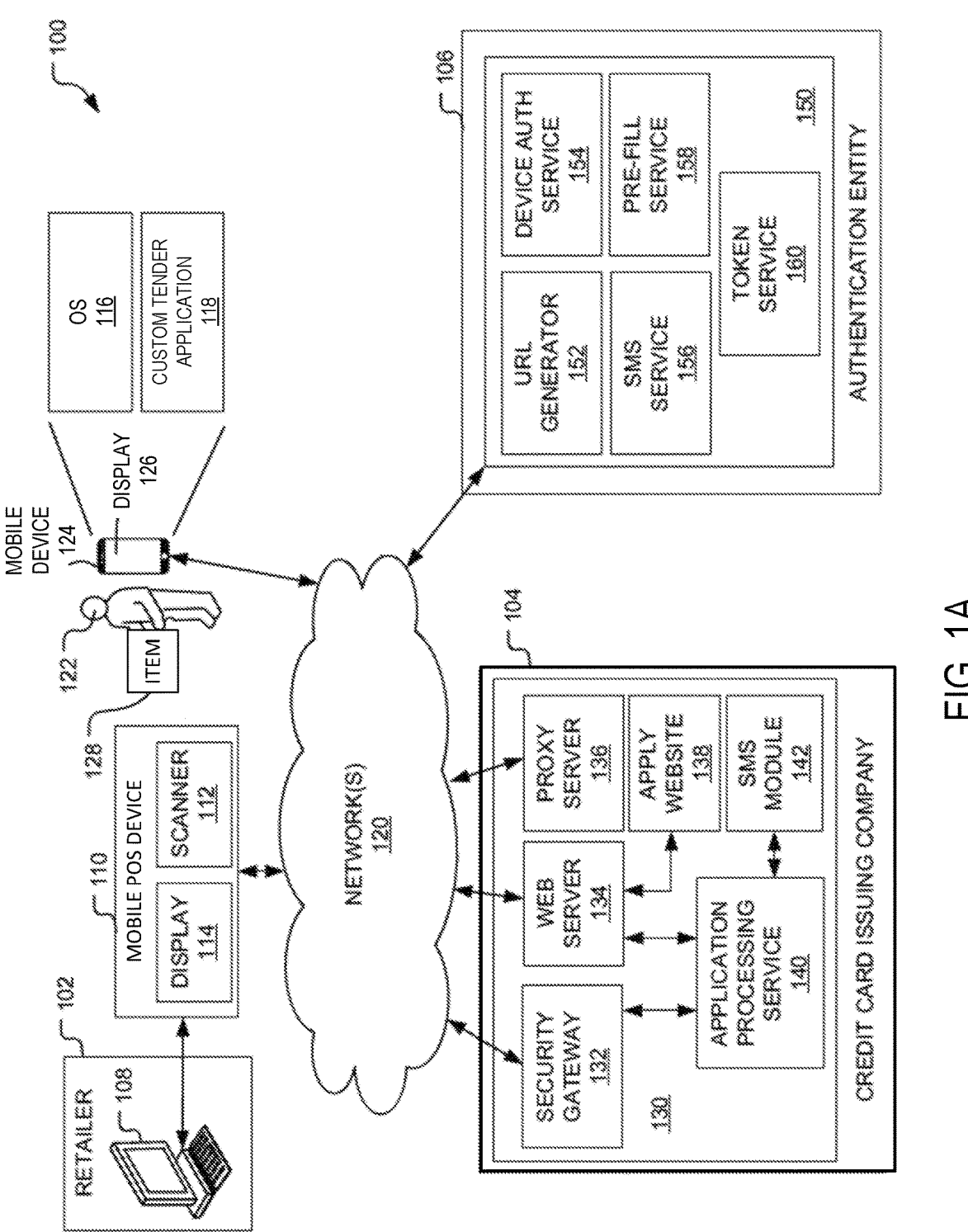
FIG. 1A depicts aspects of a system that can be used with custom tender payments in accordance with examples described herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples of embodiment(s) only and is not intended to limit the scope, applicability or configuration of the disclosure. Rather, the ensuing description of the examples of embodiment(s) will provide those skilled in the art with an enabling description for the described implementations. In the following description, for the purposes of explanation, specific details are set forth in order to provide a thorough understanding of certain inventive embodiments. It is understood that various changes can be made in the function and arrangement of elements without departing from the spirit and scope as set forth in the appended claims. Additionally, it will be apparent that various embodiments may be practiced without these specific details. The figures and description are not intended to be restrictive.

As described above, a point of sale (POS) terminal is where the checkout process occurs in both online and in-store purchases, and is usually the last interaction a shopper has with a retailer during a transaction. For some shoppers, the POS terminal is the most important part of the entire shopping experience. Modern POS systems can be built with ecosystem-specific applications that limit certain credit options and present further barriers to transactions for purchase options other than those directly associated with the POS environment (e.g., a mobile environment).

Examples described herein include modular custom tender systems that can be integrated with a modern POS system to expand the functionality of an ecosystem-specific application. In some examples, the expanded functionality can be created either with a POS interface to allow connections with another device, such as a user's smartphone. In other examples, the expanded functionality can be integrated as part of a POS terminal. In one particular implementation, an ecosystem-specific software development kit (SDK) can be used to create systems to allow a POS to invoke a custom tender section. A custom tender application can then interface with the existing ecosystem-specific application for secure alternative payment operations that are outside of the core ecosystem specific POS operations. An interface element can be integrated with a POS user interface to call the custom tender application as one option for a POS payment. When the custom tender application is selected using the interface element, a payment flow can be initiated using the custom tender application, operating either on a separate device (e.g., a user's smartphone or computing device) or on the POS device. After the secure payment is processed using the custom tender application, the flow control can return to the POS device, and the POS device can return to the existing ecosystem-specific operation for any further operations.

Some modern POS devices can, for example, include a screen that swivels to face a user when a payment portion of a flow occurs. The use of such a screen allows a user to maintain privacy and security when making payments with the POS device. Such a screen also can allow a user privacy to request credit as part of a credit application in a purchase flow that can then be used for payment, as well as other functionality such as registration for rewards, account balance or status checks, or other operations that include secure user data where security is improved by keeping the data from a merchant. Examples described herein can improve the operation of a POS by providing additional functionality using existing device hardware as described above. Additionally, operation of POS device can also be improved with examples described herein with additional functionality that can include improve security for sensitive user information, such as credit and financial data. The improved security for a device can be created by modular and upgradable custom tender applications and operations that can use secure independent systems that are controlled by a user rather than managed through a merchant system.

POS device operations can include both payment transactions and credit application operations. Various considerations can be involved in such transactions or credit offer operations, such as lender and merchant concerns related to fraud, and regulatory controls on data sharing when the data used in such transactions can be subject to a variety of privacy and regulatory considerations. Custom tender applications in accordance with examples described herein can be used to fully integrate account security features and promotion systems. Integration of account security systems and promotional systems (e.g. as supported by a particular credit or credit card program that provides credit to customers of a merchant) for a wide variety of systems that can be outside of an ecosystem-specific structure associated with a specific POS device. Examples described herein can dynamically integrate account security with a POS device to improve the operation of the device, while seamlessly integrating with ecosystem-specific elements of the particular POS device.

FIG. 1A is a block diagram of a system 100 in which custom tender payments can be performed in accordance with some examples. In example system 100 of FIG. 1A, POS device 110 can include a user interface element for a custom tender option as described above. The custom tender option can be presented as a customer 122 is purchasing an item 128. When the custom tender option is selected on POS device 110, the POS device 110 can communicate with custom tender application 118 on the customer 122 mobile device 124. Additional aspects of such systems and operations of a custom tender application 118 are described below.

The example system 100 includes a retailer 102, a credit card issuing system 104, and an authentication entity 106. In some systems, aspects can be merged, such as for example, the authenticating entity 106 being merged with the credit issuing system 104 such that devices of entity 106 and system 104 can be the same device or devices. The retailer 102 (e.g. a merchant or other client of authentication entity 106) includes a retail computing system 108 connected to at least one POS device 110. The illustrated POS device 110 includes a scanner 112 (e.g., a barcode scanner) and a display device 114. The POS device 110 of FIG. 1A can include various systems for communicating with mobile device 124. The communication systems can include Bluetooth®, WiFi®, or other wireless network systems for communication. In some examples, rather than communicating using local wireless communications, a code or other matching mechanism can be used to match custom tender application 118 with POS device 110 via a wide area network (e.g., the Internet) to allow communications and dynamic synchronization between POS device 110 and mobile device 124. In various implementations, the customer device 124 can access various communication channels, including short message service (SMS), text, application based communications, e-mail, web browsers, or other such communication channels.

Once a connection is established between POS device 110 and mobile device 124, custom tender operations can be performed using custom tender application 118 accessed and facilitated by an operating system (OS) on the mobile device 124, shown as OS 116. The OS can include supporting software and firmware to facilitate the operation of custom tender application 118 and access to communication systems and network(s) 120. Additionally, other implementations of POS device 110 can include a credit card scanner or other payment input, a keypad, or other such elements. Additional examples of a POS device 110 can be a tablet device, a smartphone, a laptop computer, or any other such device that can be accessed by a customer, either directly, or through an employee of the retailer. The retail computing system 108 may be directly connected or connected by one or more networks 120 (described below) to the POS device 110. The retail computing system 108 and the POS device 110 may each be implemented by one or more computing devices, which may each be implemented as a computing device with architecture 1600 described below and illustrated in FIG. 16.

Referring to FIG. 1A, the POS device 110 is configured to be operated by a customer 122 having a customer device 124 (e.g., a cellular telephone) with a display device 126 (e.g., a conventional touch screen). For example, the customer 122 may purchase one or more items 128 using the POS device 110. As will be described below, the customer 122 may also use the POS device 110 and the mobile device 124 to apply for credit. Enabling the customer 122 to request credit at the POS device 110 and complete the application process using the mobile device 124 gives the customer 122 the opportunity to save money or make flexible financial arrangements by applying for credit when it is needed in a quick and easy manner.

Referring to FIG. 1A, mobile services are provided to the mobile device 124 by a mobile service provider or carrier 170. The carrier 170 operates one or more computing devices 172 configured to communicate over the network(s) 120. The computing device(s) 172 may each be implemented as the computing device with architecture 1600 described below and illustrated in FIG. 16.

The credit card issuing system 104 operates one or more computing devices 130. The computing device(s) 130 implement a security gateway 132, a web server 134, a proxy server 136, an application processing service 140, and a SMS module 142. The security gateway 132 is configured to communicate with the SCO device 110 over the network(s) 120. The web server 134 and the proxy server 136 are both connected to the network(s) 120. The web server 134 is configured to generate an apply website 138. The application processing service 140 is configured to communicate with the security gateway 132 and/or the web server 134. The SMS module 142 is configured to communicate with the application processing service 140. The SMS module 142 may be implemented by middleware. By way of a non-limiting example, the computing device(s) 130 may each be implemented as the computing device architecture 1600 described below and illustrated in FIG. 16.

The authentication entity 106 operates one or more authentication computing devices 150 configured to communicate over the network(s) 120. The authentication computing device(s) 150 may implement a Uniform Resource Locator ("URL") generator 152, a device authentication service 154, an SMS service 156, a pre-fill service 158, and/or a token service 160. By way of a non-limiting example, the authentication computing device(s) 150 may each be implemented as the computing device with architecture 1600 described below and illustrated in FIG. 16.

As described herein, a customer device 124 can be used in conjunction with POS device 110 to establish secure communications between customer 122 and retailer system 108. In some contexts, a customer 122 is concerned about privacy and financial communications, in particular with respect to a retailer employee that may be communicating with customer 122. A customer 122 can additionally have concerns about data being communicated with retailer system 108 being visible to checkout employees of the retailer in ways that customer 122 can wish to avoid, such as the possibility of a credit request being rejected. Examples described herein use a unique URL generated by URL generator 152 (e.g., for generating unique tokenized URLs) of authentication entity 106 to establish secure communications between customer device 124 and retailer system 108 in ways that enable additional privacy and security. This also enables initiation of certain data communications using POS device 110 to allow a retailer to improve sales through offers to customers made through devices associated with the retailer, such as POS device 110.

In various examples described herein, POS device 110 can use information from retail system 108 to identify offers available from system 104. In response to an indication of interest from a customer 122 (e.g. using POS device 110), the retail computing system 108 can communicate request data to authentication entity 106. This can include identifying information from POS device 110 or customer device 124 that can be used by device authentication service 154 to confirm information regarding devices related to the request data. This can include data about a location or store associated with POS device 110. This can include identifying account information, location information, or any other such context information about customer device 124. The request data and information from device authentication service 154 can also provide information to other services. For example, SMS service 156 can identify whether authentication entity 106 has authorization to communicate with customer device 124 in accordance with regulations limiting the ability for a business to initiate communications with customer devices such as device 124. Additionally, based on other information associated with the request data, such as an expected credit request associated with the request data, pre-fill service 158 can be activated to identify or generate information for a credit request or other such information to be used in a subsequent communication from authentication entity 106 to either customer device 124 or POS device 110.

Token service 160 can act in a number of ways to facilitate secure communications between customer 122 and various other services and devices, including retail computing system 108 and credit card issuing system 104. Additionally, token service 160 can tokenize a URL generated for customer 122 by URL generator 152 in response to request data received via retail computing system 108. Tokenization is a process of substituting sensitive data elements with non-sensitive equivalents (e.g. tokens). The token is a reference identifier that can be mapped to the sensitive data via token service 160. Such a token service 160 can use large random number in combination with other systems, such as timing systems, to limit and secure the use of sensitive data being communicated over networks such as networks 120.

In some systems, information from a POS device 110 can be used by a token service 160 to generate a secure unique URL via URL generator 152 that has a use specific to retail computer system 108 or POS device 110. Such use can further be limited by use specific to customer 122 or customer device 124. Additional limits can be applied to specific items 128 in association with a specific customer 122 or POS device 110. For example, if request data received at authentication entity 106 includes information about a merchant location for POS device 110, an item 128 at that merchant location that a customer 122 is considering purchasing, along with information about the customer device 124 and a credit request, then a token service 160 can create a secure URL in conjunction with URL generator 152 to facilitate a credit offer specific to the location of POS device 110 and purchase item 128 that can only be accessed by customer device 124. Additional limitations such as time limitations can be added, so that the secure URL can only be accessed via customer device 124 for a limited amount of time (e.g. 10 minutes, 1 hour, 1 day, etc.) Token service 160 can be used in conjunction with other information both to allow generation of a tokenized URL with URL generator 152, as well as to manage responses to the URL initiated from customer device 124. This can include generating responses when a time limit is exceeded or an unexpected device uses the secure URL. This can also include accessing secure information with a token is received from an authorized device (e.g. client device 124 or POS device 110).

As described above, in some examples, authentication entity and credit issuing system 104 can, in some implementations, be the same system. In such a system, a token service 160 can further act to generate tokens for credit numbers or other aspects of financial transactions which involve credit system 104. In additional examples, other aspects of system 100 can further be altered or include additional or intervening elements, such as multiple customers, customers with shared accounts, additional merchant or retailer systems, subsystems that can operate independently, such as the use of an independent SMS service 156, or any other such structure for a system 100.

Figure 1B:
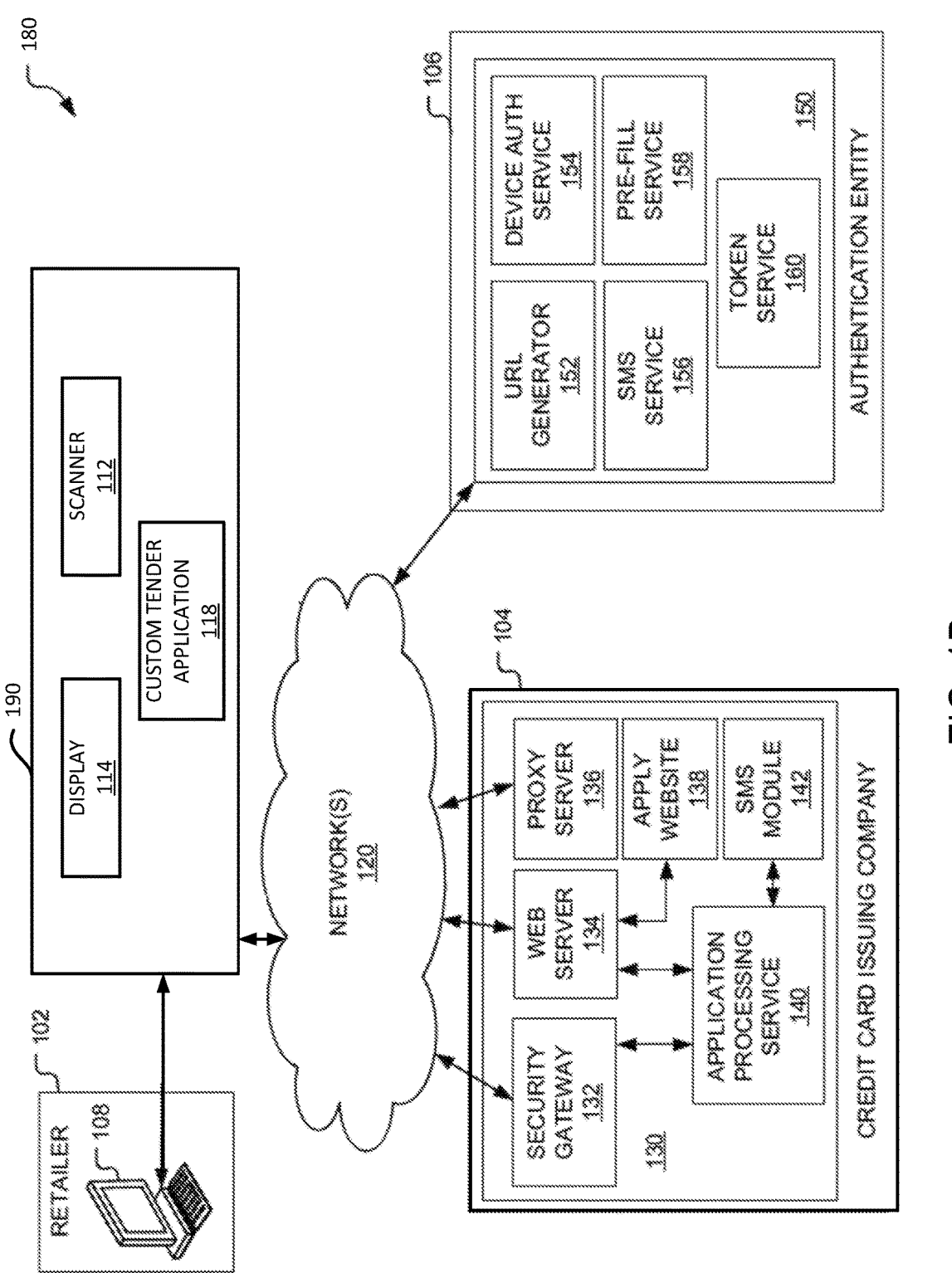
FIG. 1B depicts aspects of a system that can be used with custom tender payments in accordance with examples described herein.

FIG. 1B is a block diagram of a system 180 in which custom tender payments can be performed in accordance with some examples. System 180 of FIG. 1B is similar to system 100 of FIG. 1, except system 180 includes a custom tender application 118 operating on POS device 190. Custom tender application 118 can be used to access elements of a credit card issuing system 104, an authentication entity 106, or any other such system as part of custom tender operations outside the ecosystem of the POS device 190 in a similar manner to custom tender application 118 of FIG. 1A. Additionally implementations can include elements of custom tender application 118 operating on both a POS device such as POS device 190, as well as on a mobile device 124, or any other device including an additional third party device. In any such implementation, custom tender application 118 can be used to provide additional functionality to the POS device in a merchant system 108 environment that would not otherwise be available, including additional security that can be available through the custom tender application and associated back-end functionality described below.

Figure 2:
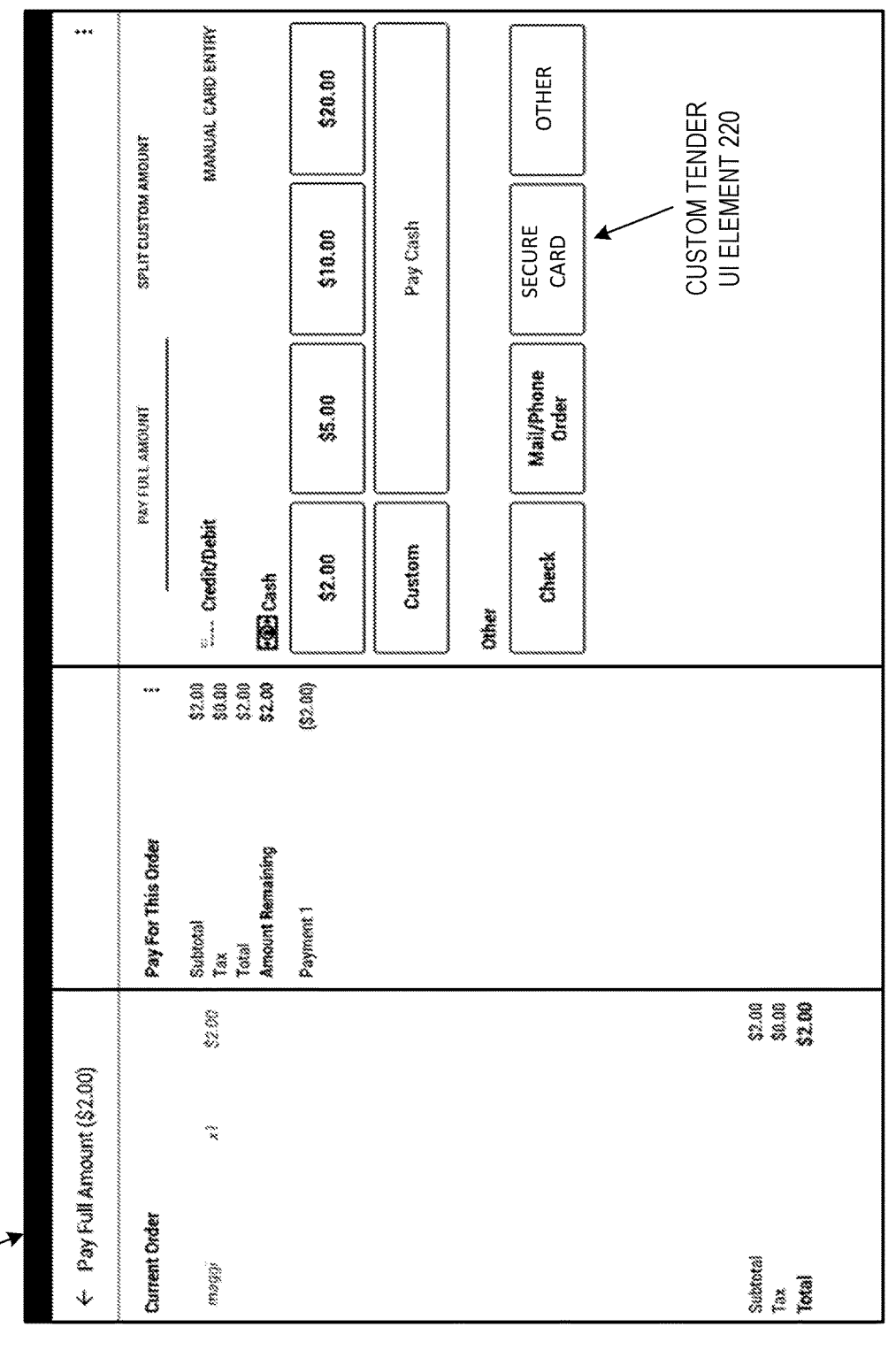
FIG. 2 depicts aspects of a user interface for custom tender payment with a POS device and a mobile device application in accordance with some examples.

FIG. 2 depicts aspects of a user interface 200 for custom tender application 118 with a POS device in accordance with some examples. The user interface 200 includes details on a purchase for a product or service, including payment details and options. In addition to options for paying with cash, check, an ecosystem compliant manual card entry, or other options, a custom tender UI element 220 is included. The user interface element 220 can be a simple user interface element using the SDK for a POS device to initiate options and payment follow for a custom tender option that is outside of the POS device standard flow. Selection of the UI element 220 (e.g., via a touchscreen interface) can invoke custom tender application 118, including operations and functionality described below.

Figure 3:
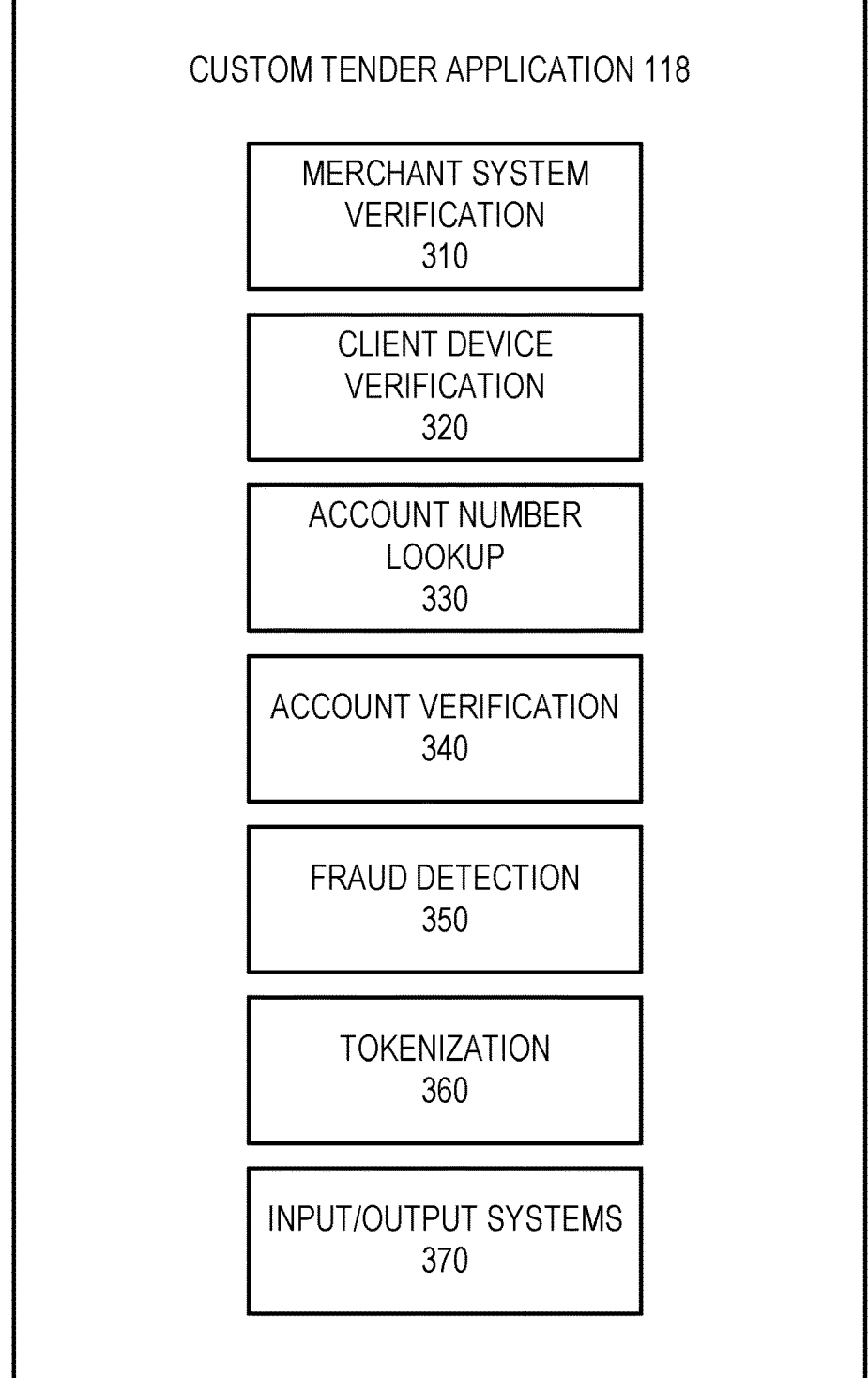
FIG. 3 depicts aspects of a mobile device application for custom tender payment with a POS device in accordance with some examples.

FIG. 3 depicts aspects of an example custom tender application 118, which can be used within a system 100 or other systems to dynamically implement custom functionality as well as data security as described herein. Custom tender application 118 includes a number of different elements that can be implemented as modules or different devices networked to implement various security functions. Custom tender application 118 can be implemented as an application on a POS device (e.g., POS device 110 or 190), as an application on a mobile device (e.g., mobile device 124), as modules on a server, or as any combination of the above across any number of devices. Input/output systems 370 can manage transmission of data and receipt of data both between different elements of the system 104 as well as with other devices, such as merchant servers and client devices, using any suitable network and communication components, such as those described below with respect to FIG. 16. The described elements of custom tender application 118 include merchant system verification 310, client device verification 320, account number lookup 330, account verification, fraud detection 350, and input/output systems 370. In other examples, these elements can be grouped in a variety of different ways. For example, client device verification 320 and fraud detection 350 can, in some examples, be structured as a single sub-system, or can be largely implemented as a separate system (e.g. using separate fraud detection system(s) such as those of device(s) 150). In various examples described below, the elements of account security system perform different parts of the operations to implement security as part of a secure transaction that uses modular elements to add to the security of larger systems.

Merchant system verification 310 interacts with merchant systems such as merchant system 108 to authenticate that the merchant is safe for a user to perform a transaction with. This verification can be done using security measures such as using security keys, transaction history data, merchant registration, and other verification tools. Merchant system verification 310 can create tokens that can be used as part of a secure transaction to allow participants in the transaction to confirm that they are interacting with verified participants that have met security standards and have access to the token generated by merchant system verification 310 for a specific transaction.

Client device verification 320 can include security operations to check for issues with a client's device, such as malicious software installed on a client device, a history of questionable transactions or fraud associated with a specific device, or other operations. This verification can be implemented via communication with a specific client device, accessing database data with fraud history data, or requiring installation of software on a client device to check for security issues with a client device. In some examples, merchant system verification 310 operations and client device verification 320 operations can be used as gateways for additional sub-systems, such that merchant systems and client devices are not allowed access or use of additional systems such as account number lookup 330 and account verification 340 unless the threshold requirements of merchant system verification 310 and client device verification 320 have been met.

Account number lookup 330 and account verification 340 interact with client devices to receive client data and access sensitive client account information. These operations can, for example, include receiving information such as an address, phone number, government identifier, or other such information, and using this information to access an account number associated with a client credit account. The client credit account number can then be provided to the client device or tokenization 360 element with an authorization to use the credit account with a specific secure transaction (e.g. a transaction associated with a client token generated by merchant system verification 310.) Similarly, account verification 340 can accept a client account number associated with the client credit account, and provide information such as an available balance to allow a client to confirm that the available balance is sufficient for a current secure transaction. The operations of account verification 340 and account number lookup 330 can be associated with a particular transaction, and used to trigger generation of tokenized client data by tokenization 360 element. This tokenization can involve generation of a one-time set of data that can be used only for a specific transaction. In some examples, after the tokenized client data is generated in response to account security system interacting with a client device, the tokenized client data is then stored until it is requested by the merchant system associated with the secure transaction, or until a deletion event occurs. Such deletion events can include a threshold amount of time, a number of incorrect requests for data associated with the client device or the client account, or other such events. If a deletion event occurs, a subsequent request for the data by the verified merchant can be met with a response indicating that the data has expired and the secure transaction is to be restarted (e.g. a new secure transaction initiated and the original transaction abandoned.)

Throughout operations for data security described herein, fraud detection 350 can monitor data and generate alerts or halt operations for a specific transaction when a risk of fraud is identified.

Figure 4:
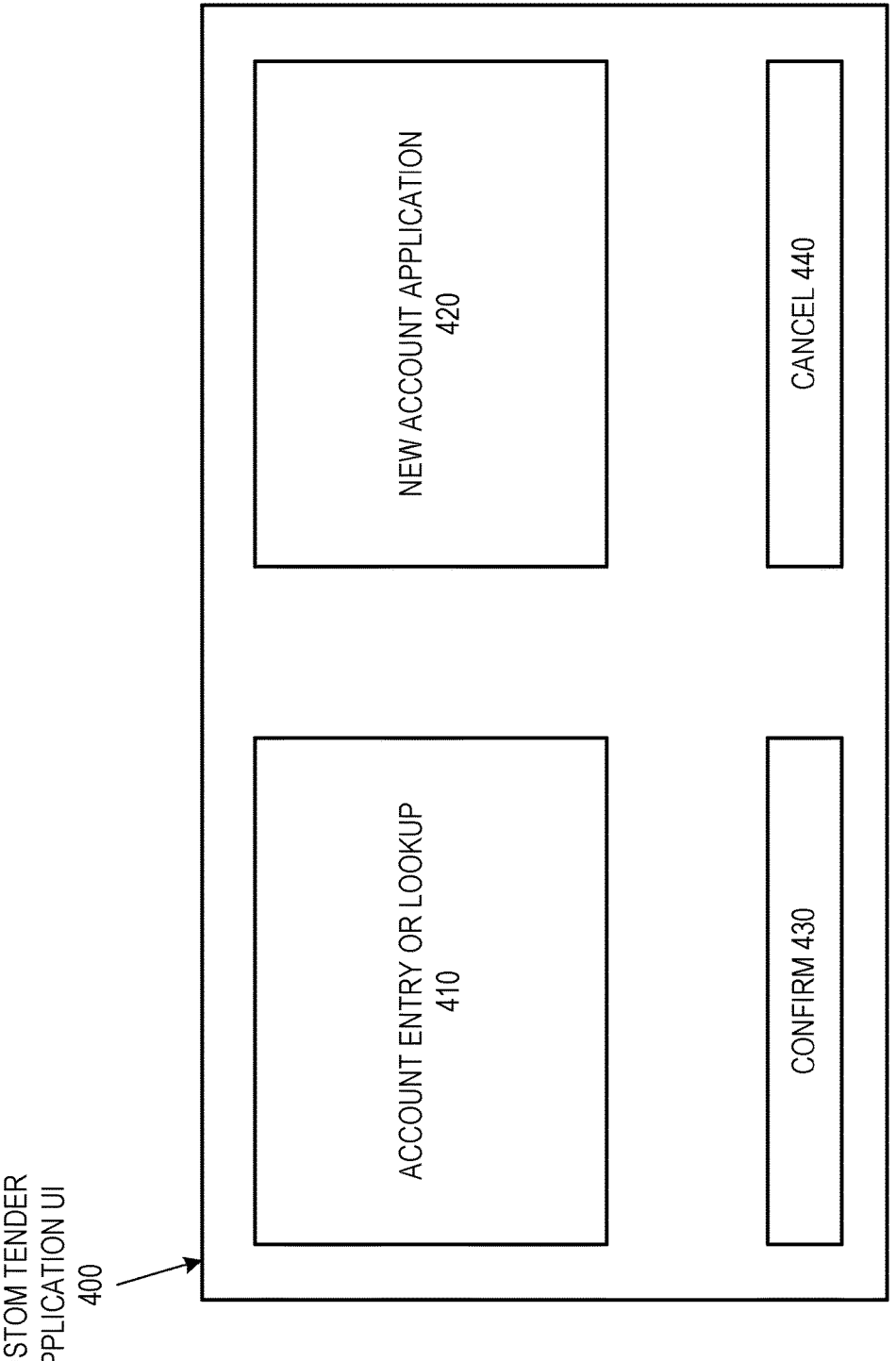
FIG. 4 depicts aspects of a user interface for custom tender payment with a POS device and a mobile device application in accordance with some examples.

FIG. 4 depicts aspects of a user interface 400 for custom tender payment with a POS device and a mobile device application in accordance with some examples. As described herein, in some examples such as the example of system 100 shown by FIG. 1A, the channel between client device 124 and custom tender application 118 can be used modularly and dynamically for multiple types of services, including communication of sensitive client data, account lookup services, credit offer services, and promotional offer services associated with specific secure transactions. The dynamic functionality can allow the particular elements of a custom tender application 118 to be updated for customer specific options as well as for security updates and changes to respond in real-time to security threats. Custom tender application UI 400 shows a simple example of a UI for custom tender application 118, but the particular UI presented can be updated and modified dynamically and in real-time based on security information (e.g., from fraud detection 350), customer specific data, merchant specific data, location specific data, or any other such data. In some examples, dynamic updates can be provided to a mobile device (e.g., mobile device 124) with a minimal fixed element (e.g., a selection element to initiate communication with a mobile device) operating on a POS device. In other examples, the services can be integrated in a single POS device such as POS device 190 in system 180 of FIG. 1B.

The example user interface 400 includes an account entry or lookup element 410, a new account application element 420, a confirm 430 element, and a cancel 440 element. The details of the elements in a particular example (e.g. element 410 or element 420) can be accessed by a custom tender application 118 from a database based on input parameters received from a merchant system 108, a client device 124, or both. These input parameters can include combinations of data, including general data about the transaction from merchant system 108, and sensitive client data from client device 124. Such data can include an industry identifier associated with a product or service being purchased. Such data can also include one or more of a merchant identifier, an account number, a purchase amount, a client identifier, or any other such information. Based on the input parameters received at the account security system, the system can access available promotions based on the parameter details. For example, a particular industry identifier can be associated with a plurality of promotion options, with different industry identifiers associated with different promotion offers. Similarly, combinations of other information such as a purchase amount can be used to filter the available offers, or to provide additional offers. Such data can, for example, be accessed from a database in some examples. When all available offers are identified, a communication with data on the available offers to be displayed in user interface 400 can be generated and transmitted by custom tender application 118 to client device 124 or to other elements or applications operating on a POS device 110. An input can select any available functionality from the display, and confirm the selection with additional confirmation elements such as confirm 430 element, or cancel 440 element of the user interface 400. Cancel 440 element can, for example, be used to close user interface 400 and return either to another interface for communications with custom tender application 118, or to another interface for communications with merchant system 108.

Figure 5:
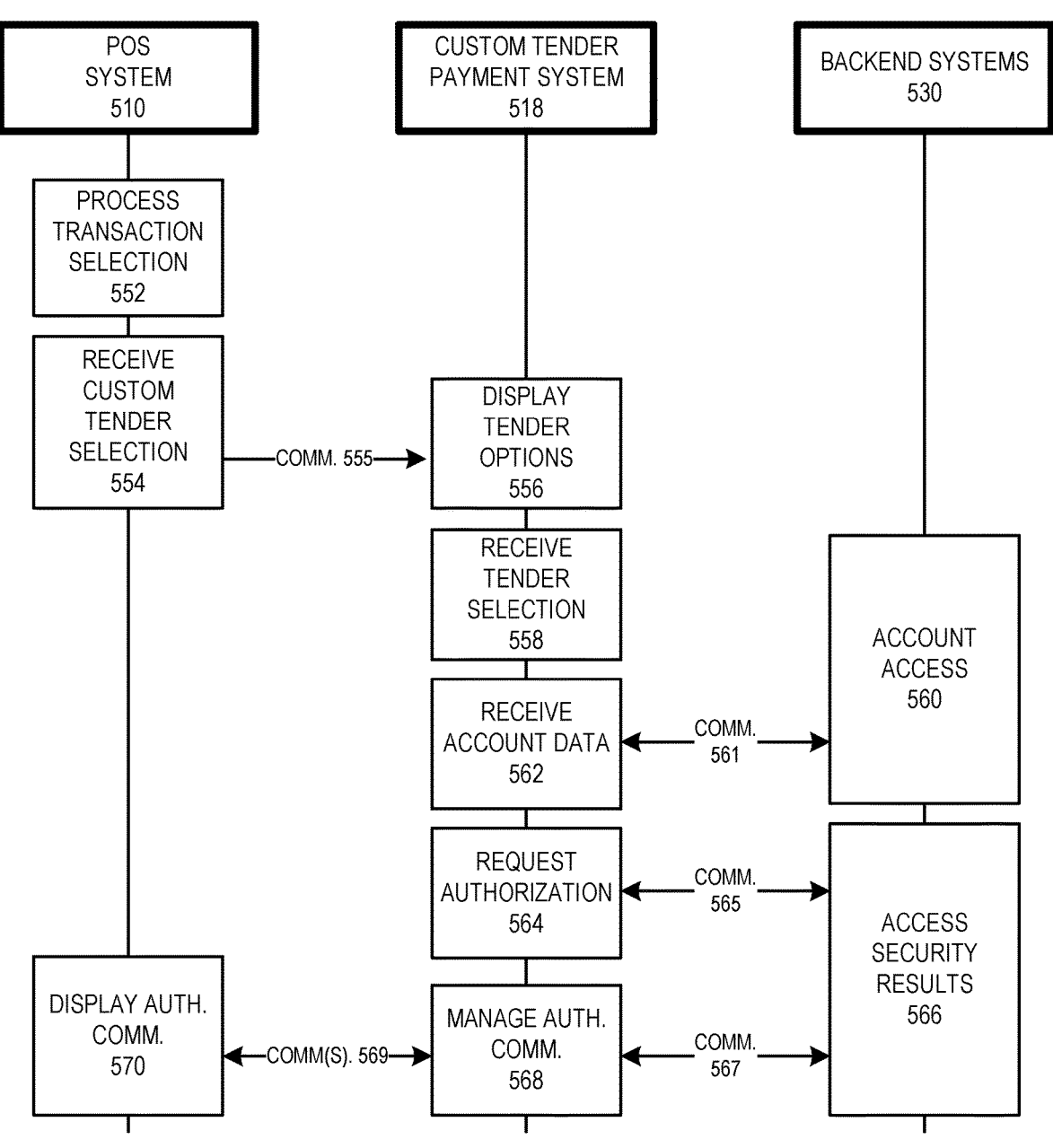
FIG. 5 depicts aspects of a system and system operations custom tender payment operations in accordance with some examples.

FIG. 5 depicts aspects of a system and system operations custom tender payment operations in accordance with some examples. FIG. 5 includes POS system 510, custom tender payment system 518, and backend system 530. POS system5 510 includes a POS device (e.g., POS device 110) as well as any other supporting devices (e.g., elements of a merchant system). Custom tender payment system 518 includes a custom tender payment application (e.g., application 118), and any devices operating the application. The custom tender payment system 518 can be limited to a single device (e.g., a mobile device 124 or a POS device 190) or can include multiple devices operating different portions of a custom tender application. Backend system 530 can include databases, servers, and other such devices that can store information or provide services integrated with a custom tender payment system 518 as described herein.

The operations of FIG. 5 begin with process transaction selection operation(s) 552 on POS system 510. Operation(s) 552 can be a selection received at a POS device that is associated with the purchase transaction. The process transaction selection operation(s) 552 can include multiple operations where a customer interacts with a merchant system to select and finalize purchase details for a transaction. Once the flow for the transaction is finalized with details identified for a customer to provide payment, the process transaction selection operation(s) 552 can include presenting multiple payment options to a customer (e.g., using an interface such as mobile POS device UI 200).

Receive custom tender selection operation 554 includes processing a user interface selection to initiate use of a custom tender payment system 518. Such a selection and an associated initiation of a customer tender payment system 518 can, for example, be a user interface selection of a custom tender UI element 220 that is processed and used to invoke a custom tender application (e.g., custom tender application 118) as part of custom tender payment system 518. The result of POS system 510 processing a received selection in operation 554 can be communication 555, which can either be a communication to a mobile device (e.g., for a system with custom tender application operating on a mobile device such as shown in FIG. 1A) or a communication within a POS device (e.g., for a system with a custom tender application integrated in a POS device such as POS device 190 of system 180 in FIG. 1B).

After a custom tender application is invoked in response to the selection of operation 554 and communication 555, the custom tender payment system (e.g., including custom tender application 118) displays a user interface with options in operation 556. The display of tender options within custom tender payment system 518 can, for example, be display of a user interface such as custom tender application UI 400 of FIG. 4. As described above, the actual set of options can be dynamically configured based on a variety of input data and circumstances associated with the particular transaction processed using POS system 510. The configuration can include account lookup options, account selection (e.g., to use for payment) options, credit application options, security options, or any other such options that can be dynamically selected as options for a particular set of circumstances (e.g., customer, time, location, merchant, product type, etc.)

In receive tender selection operations 558, the custom tender payment system 518 processes the particular options elected by a customer from the options presented in operations 556, and in operations 562, and in operations 562 custom tender payment system 518 accesses one or more backend systems 530 that are associated with the selected options in communications 561. The backend system(s) 530 perform account access operations 560 to provide any data as well as any processing associated with a selected option, so that operations 562 and operations 560 operate in concert using communications 561 to perform any functionality needed for the custom tender option selected.

For payment using a custom tender payment system 518, any initial operations are performed in operations 560 and 562, and then a final set of operations will involve an account selected to be used for payment via custom tender payment system 518. The custom tender payment system 518 is particularly configured to support payment accounts and options not supported via an ecosystem operating on POS system 510, and so the custom tender payment system 518 operations 562 support additional accounts, and request authorization operations 564 operations are for accounts supported by custom tender payment system 518 but not supported by POS system 510 outside of the integration with custom tender payment system 518. Request authorization operation(s) 564 communicate with backend systems 530 using communications 565 to get authorization for payment using any security results operations 566 implemented via backend systems 530. Depending on the particular security features associated with the payment option selected in operation 558, security results operations, management of authorization communication operations 568, and display authorization communication operations 570 can include various different steps using communications 567 and 569 to implement particular security and authorization operations. As described above, the particular security operations can be selected and modified dynamically and in real-time based on the particular circumstances of a transaction using an application and custom tender payment system 518. The end result of any authorization and security operations is an authorization result (e.g., approval or denial) that can be displayed on a POS system 510 to inform a customer and a merchant in operation 570 about the results of an authorization request, and whether the payment for the transaction has been approved. If the payment is not authorized, the customer can attempt a different payment. The different payment can be another payment option using a custom tender payment system 518, or can be another payment option available through POS system 510 (e.g., cash, check, an ecosystem compliant credit account, etc.) If the payment is authorized, POS system 510 can complete the operations associated with the transaction, which can include further operations such as providing transaction details, providing additional post-transaction promotions (e.g., offers associated with future transactions), account sign-up options, or other POS system 510 functionality. In other examples, the POS system 510 has no further operations for the transaction, and waits for a new set of operations 552 for a different transaction.

Figure 6:
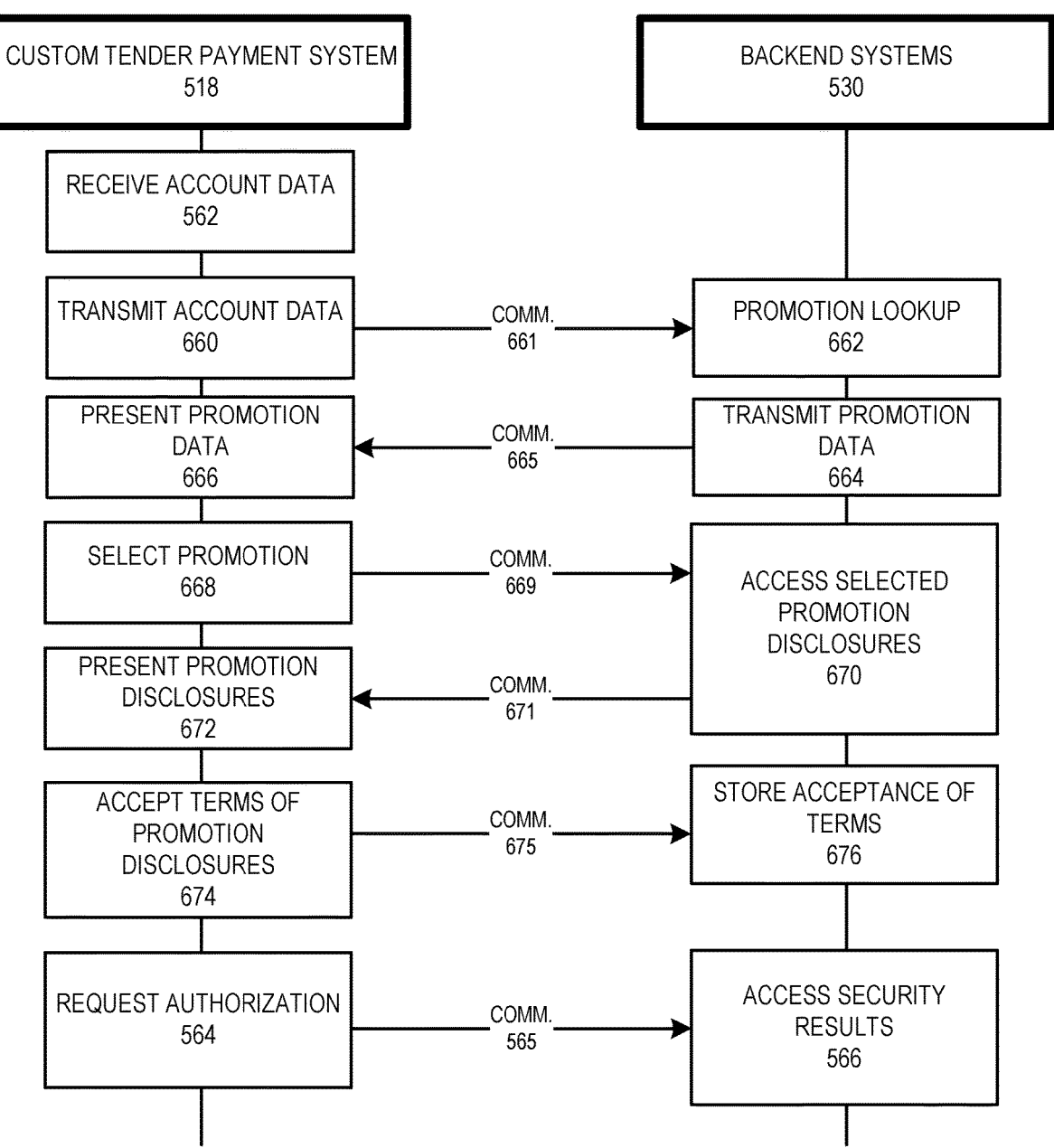
FIG. 6 depicts aspects of a system and system operations custom tender payment operations in accordance with some examples.

FIG. 6 depicts aspects of a system and system operations custom tender payment operations in accordance with some examples. FIG. 6 includes operations and communications between custom tender payment system 518 and backend system 530 to enable promotional offers outside of a specialized POS ecosystem using a custom tender payment application described above as part of a custom tender payment system 518. The operations of FIG. 6 can be, in some examples, operations that occur as part of receive account data operations 562 or between receive account data operations 562 and request authorization operations 564. As illustrated, following receive account data operations 562 on custom tender payment system 518, the custom tender payment system 518 transmits account data in operations 660 to backend system 530 in communications 661. Promotion lookup operations 662 then occur in operations 662, and backend system 530 transmits promotion data in operations 664. Promotion data is received at custom tender payment system 518 from communications 665, and present promotion data operations 666 include facilitating presentation of promotion data or promotion options on a mobile device (e.g., mobile device 124) or a POS device (e.g., POS device 190).

In operations 668, a user provides a promotion selection and the custom tender payment system 518 processes the selection and generates a transmission to inform backend system 530 of the promotion selection. Backend system 530 receives promotion selection data in communications 669, and in operations 670, accesses promotion disclosure information for the selected promotion. This promotion disclosure information can include mandated disclosures, supplemental information about a selected promotion, dynamic elements of a promotion based on customer or other context data associated with a particular promotion offer, or other such data. Operations 670 can also include generation of a transmission including the promotion disclosures, which are transmitted in communication 671. In Operation 672, custom tender payment system 518 receives the promotion disclosures and facilitates display of the disclosures to a customer. In operation 674, an acceptance input is processed by custom tender payment system 518, and an acceptance communication is generated. In operation 676, backend system 530 receives the acceptance data in communication 675, and stores the acceptance data (e.g., in a database or other system as part of or connected to backend system 530). Operations of custom tender payment system 518 and backend system 530 can then proceed with other operations and communications to facilitate a transaction using a secure custom tender payment, including request authorization operations 564, communications 565, and access operations 566 for security results and associated authorization decisions as described above.

Figure 7:
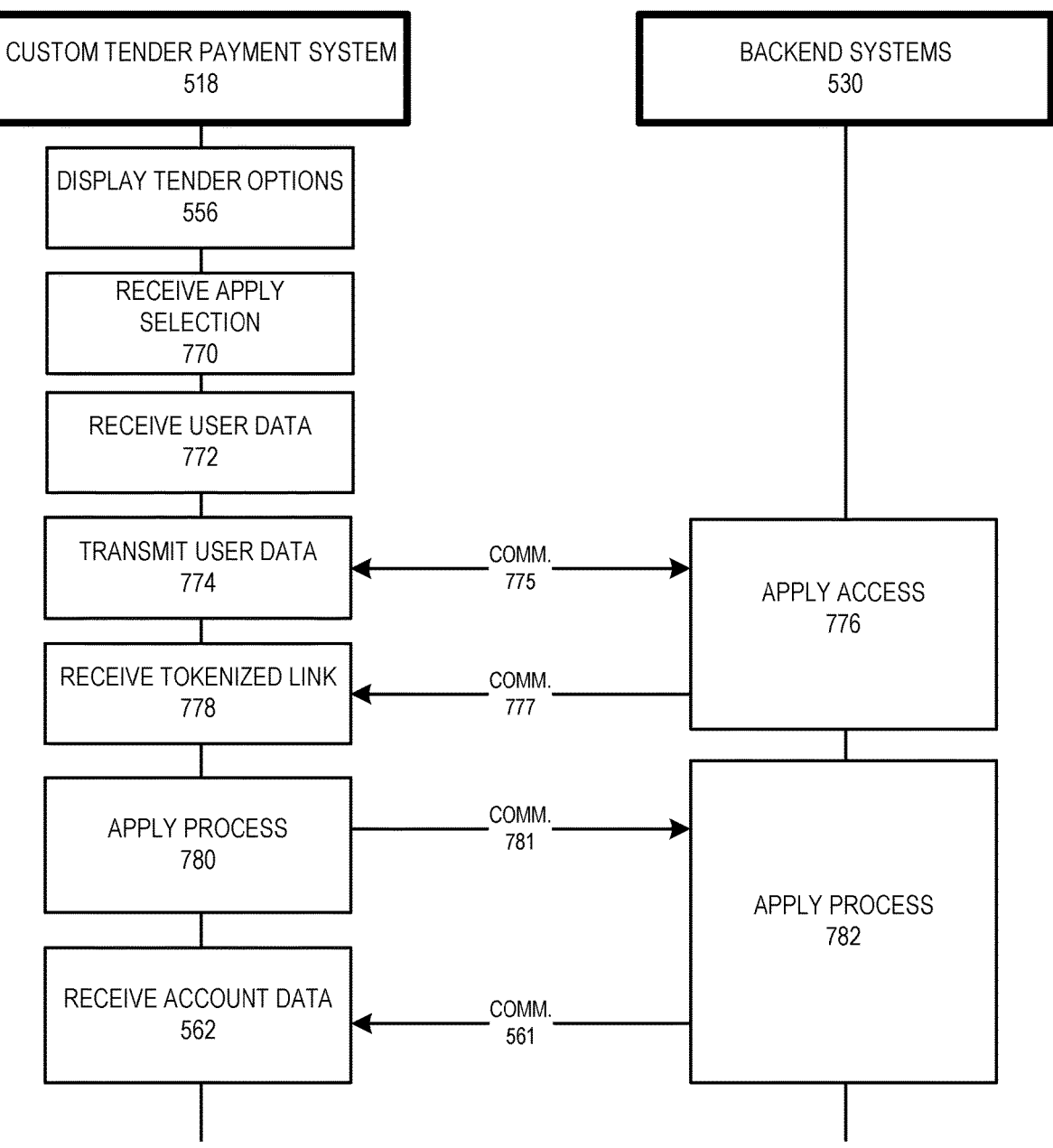
FIG. 7 depicts aspects of a system and system operations custom tender payment operations in accordance with some examples.

FIG. 7 depicts aspects of a system and system operations custom tender payment operations in accordance with some examples. Similar to the operations of FIG. 6, FIG. 7 describes operations for a credit application flow that can be used by a custom tender application of custom tender payment system 518 and a merchant system (e.g., merchant system 108) to enable credit applications in a specialized POS ecosystem. Also similar to FIG. 6, FIG. 7 describes operations that can be integrated with the operations of FIG. 5 to provide functionality within POS payment flow ecosystem that is expanded using a custom tender application.

In FIG. 7, tender options are displayed in operations 556. In the example of FIG. 7, as part of custom tender application 118 as invoked on a mobile device 124 or in a POS device 190, a credit application element is displayed in the tender options. In operations 770, the custom tender payment system 518 receives and processes an input selection to apply for credit. The selection can be associated with requesting a new account or with requesting a modification to an existing account. The custom tender payment system 518 then accepts sensitive client data in operations 772 that can be kept separate from a merchant system 108 and used to securely analyze the credit application and provide a responsive decision. The user data from operations 772 is then transmitted in operation 774. In operations 776 at backend system 530 receives communication 775 with the user data, and performs operations to securely initiate an application process. In order to provide security and protect sensitive client data, the user data is not simply processed to provide a credit decision, but additional layers of security can be provided via custom tender payment system 518 in conjunction with one or more systems as part of backend systems 530. Apply access operations 776 can include tokenization operations to provide security for customer data during application operations, for example, using token service 160 with URL generator 152 and other security systems to generate a tokenized link that can then be used to access additional secure information as part of an apply process. In operation 778, a tokenized link is received in communication 777 and processed. A secure apply process can then be performed between custom tender payment system 518 (e.g., custom tender application 118 using POS device 190 or mobile device 124) working with backend systems 530 in apply process operations 780 and 782 using communications 781. Following a successful apply process, custom tender payment system 518 receives and processes account data in communications 561 associated with the new account data, and the custom tender payment system 518 can proceed to facilitate payment authorization using the new account. If the application is not successful, operations to return to display tender operations 556 can be performed, and a user can select an alternate tender option. Additional details associated with security operations that can be integrated with application options are described in more detail below with respect to FIGS. 8-12.

Figure 8:
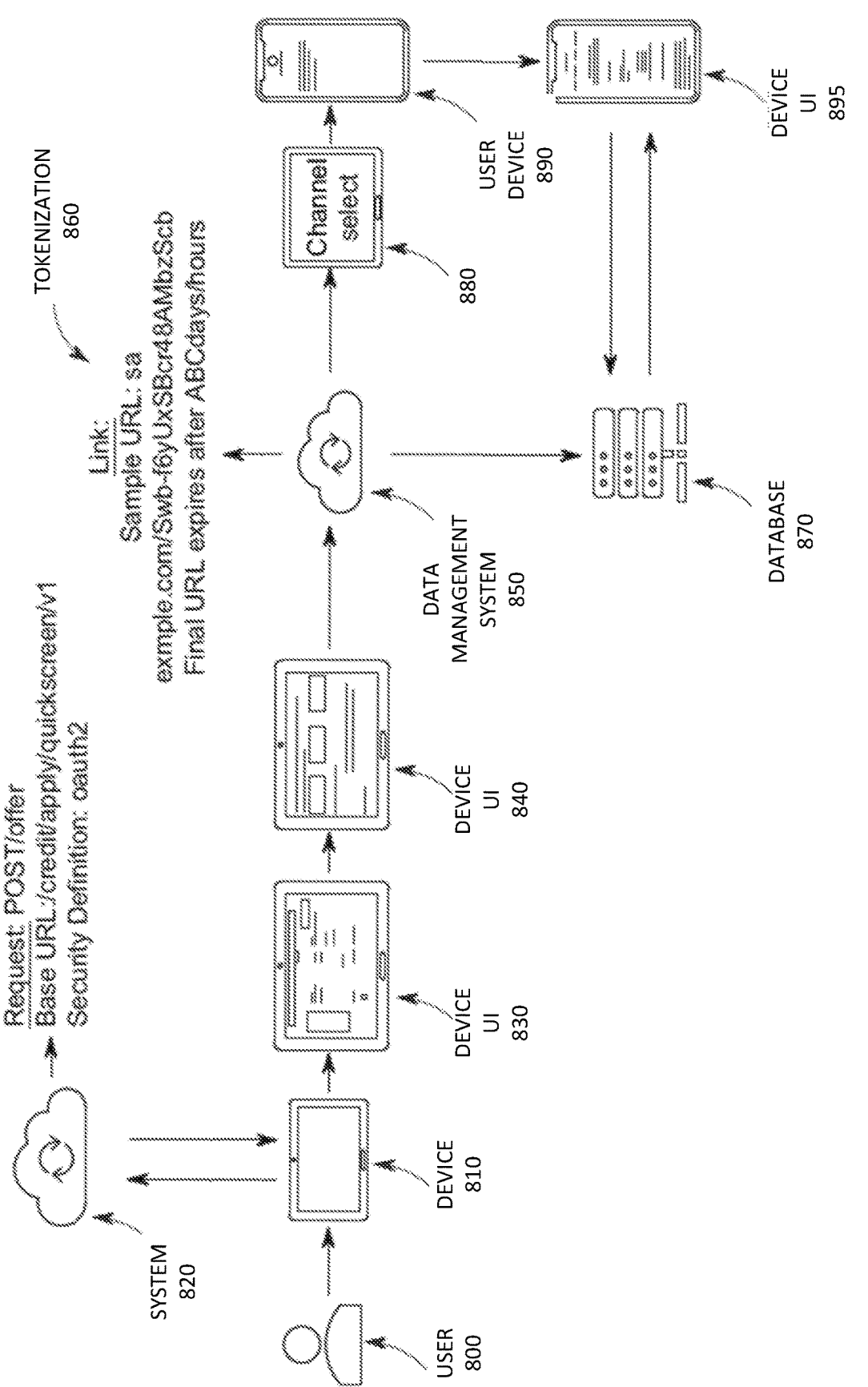
FIG. 8 shows illustrative aspects of a system for network data management that can be used with a custom tender application in accordance with at least one example.

FIG. 8 shows illustrative aspects of a system that can be used with a custom tender application in accordance with at least one example. FIG. 8, an offer occurs directly via the POS device or a mobile device 124 and is sent to the system 850 without prequalification or other initial communications. In such a system, a user 800 interacts user interfaces (UIs) of a POS device 810 (e.g., POS device 110 or 190). Just as above, this can occur either directly or using a retail employee. Inputs to device 810 can be used to initiate communications with system 820 (e.g., a digital lockbox or offer system) in order to perform initial authentication of the device 810 and the user 800 (e.g., and any associated accounts). Using interfaces 830 and 840, an offer is presented via the POS device, and the POS device is used to generate and send request data to system 850. This request data can include an application identifier, a customer name and address or other such information. In some examples, this can include contact information for a customer such as email or phone number information, or additional identifying information such as a date of birth. This information can then be used by system 850 as described above for generation of a secure one-time link 860, access to database 870 information, channel selection 880, and additional service operation such as presentation of the secure one-time link and associated credit offers via interfaces 890 and 895.

Figure 9:
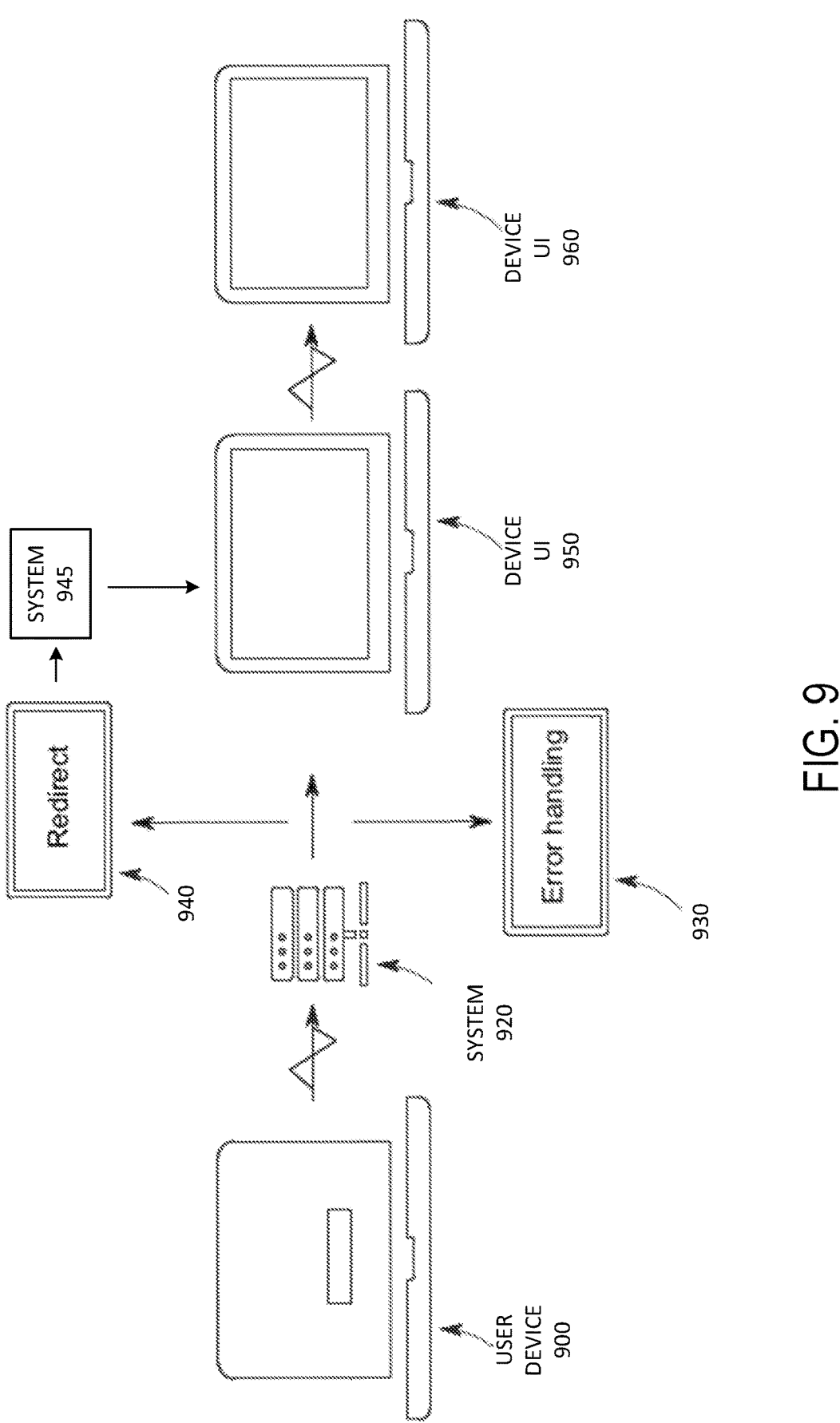
FIG. 9 shows illustrative aspects of a system for custom tender payments that can be used with a custom tender application in accordance with at least one example.

FIG. 9 shows illustrative aspects of a system for network data management that can be used with a custom tender application in accordance with at least one example. FIG. 9 illustrates additional examples of network data management similar to those of 8, but in a context of a client's device operating as both the POS device and the client device (e.g. for internet shopping). In FIG. 9, a customer device 900 logs into a retail computer system (e.g. via a retail website). The account information associated with the login can be used to access offers 910, either from the retail computer system or from a third party. As described above, this can include accessing authentication systems for an initial prequalification of a credit offer. This offer can be presented to a customer via a user interface of the system 920. If the offer is accepted, a redirect to the authentication system occurs to generate a secure one-time link in redirect 940. This redirect 940 operation can include communication of an offer identifier, a user identifier, and any other such information, and the secure one-time link can then be communicated back to the customer device. In some aspects, the redirect works with an API of system 945 (e.g., including a digital lockbox and tokenization service) to generate a unique token for the request data provided by redirect 940.

The system 945 can be, for example, an authentication system. Such an authentication system can include token services for generation of one-time URLs in real-time, dynamic response operations performed based on communications from the redirect 940. In some operations, the system 945 includes secure digital storage (e.g., a digital lockbox) that manages authentication of a user or user device 900 to allow user device 900 interactions with a custom tender application (e.g., the custom tender application 118) as described herein. In other implementations, the system 945 can generate multiple single use URLs for a communication session, and manage access to different systems to facilitate secure and private data communications between the systems to facilitate custom tender operations as described herein. In some implementations, the system 945 can use an API to accept request data via redirect 940, generate a single use tokenized URL identifying a network location (e.g., in system 945 accessible via the API of system 945) used to access secure data in a digital lockbox. User interfaces of the process can be used to select a single use URL from system 945 to access data from the digital lockbox of system 945, and to perform additional access and communication operations, such as relaying secure information (or authorization to access the information) to a third system (e.g., a merchant system), or accessing additional secure or private data using the digital lockbox of system 945.

In some implementations, when the customer device uses the secure one-time link any error handling 930 is first considered. This can include expiration of the secure one-time link, errors or corruption associated with the link, or any other such problems. For example, if the secure one-time link is shared with a device that is not authorized to use the link, an error handling 930 operation can be triggered. If no error handling 930 event occurs, then the secure communications between customer device 900 and the retail computer system can proceed with secure network data management handled using the secure channel initiated with the secure one-time link. This can include further operations and a user interface 950 for a full credit application with terms, as well as an approval and other disclosure information in an interface 960. In some examples, the secure channel initiated with the secure one-time link can be an encrypted communication using RSA encryption, advanced encryption standard (AES) communications such as AES-256 in electronic code book (ECB) or counter (CTR) modes, secure communications via a software-defined perimeter (SDP), or any other such communication.

Other examples can operate via ecommerce (e.g., using a mobile device 124) instead of via a device which is at a retail location (e.g., POS device 110). In such examples, a customer device interacts with a retail computer system, and receives a local offer from the retail system. The customer accepts the offer at the client device, and the request data is generated and sent to the authentication system via the redirect. A secure one-time URL is generated, and if no error handling exception is triggered, the authentication system facilitates secure communications for additional services via user interfaces and at the customer device. As described above, this can include credit applications and responses, credit and payment transactions, or any other such secure communications.

Some examples operate between a POS or POS device, a customer device, and a back-end system. The back-end system can include an interface management system, an authentication system, and a credit service. The interface management system can be used to prevent unauthorized access to the authentication system. As part of such operations, POS device can engage in communications with an initial interface endpoint for authorization. This authorization can then be used in interface for subsequent communications, such as communication of a request data associated with customer device. The request data can be forwarded from an interface proxy in interfaces if a valid authentication token is present and a valid request is present in the request data. If both a valid authentication token (e.g. separate from the tokenized URL as an interface security feature) and a valid request are present in the request data, the request data is provided for generation of a secure one-time link at URL generate of authentication system. The secure one-time link is passed to POS device in communication, and can then be provided to the customer device. The customer device can then use the secure one-time link with credit service for application approval via various services, such as an application interface and a decision engine. As described, in some examples, prefill services can be used with an application interface, or a client device can provide secure information to application interface, which can then be used by decision engine to respond to the completed request from application interface (e.g. a credit application).

As described above, in various implementations, a client device can operate as the POS device, such as in ecommerce implementations. This includes communications among various systems, such as an interface system, an authentication system, and a data store system. In such systems, a device communicates with an interface system for an authorization token. Request data generated by the device can then be sent to the authentication system via the interface system to protect the authentication system. If the request data includes a valid request and a valid authentication token from a previous interaction with the interface system, the request data can be sent to the authentication system. The authentication system can then use the valid request from the request data to identify and manage interactions with one or more services associated with the valid request. As described above, this can include application prefill operations (e.g. in communication with data store system) as well as secure channel selection. In any case, a secure one-time link is generated by authentication system for use in subsequent secure data management.

Figure 10:
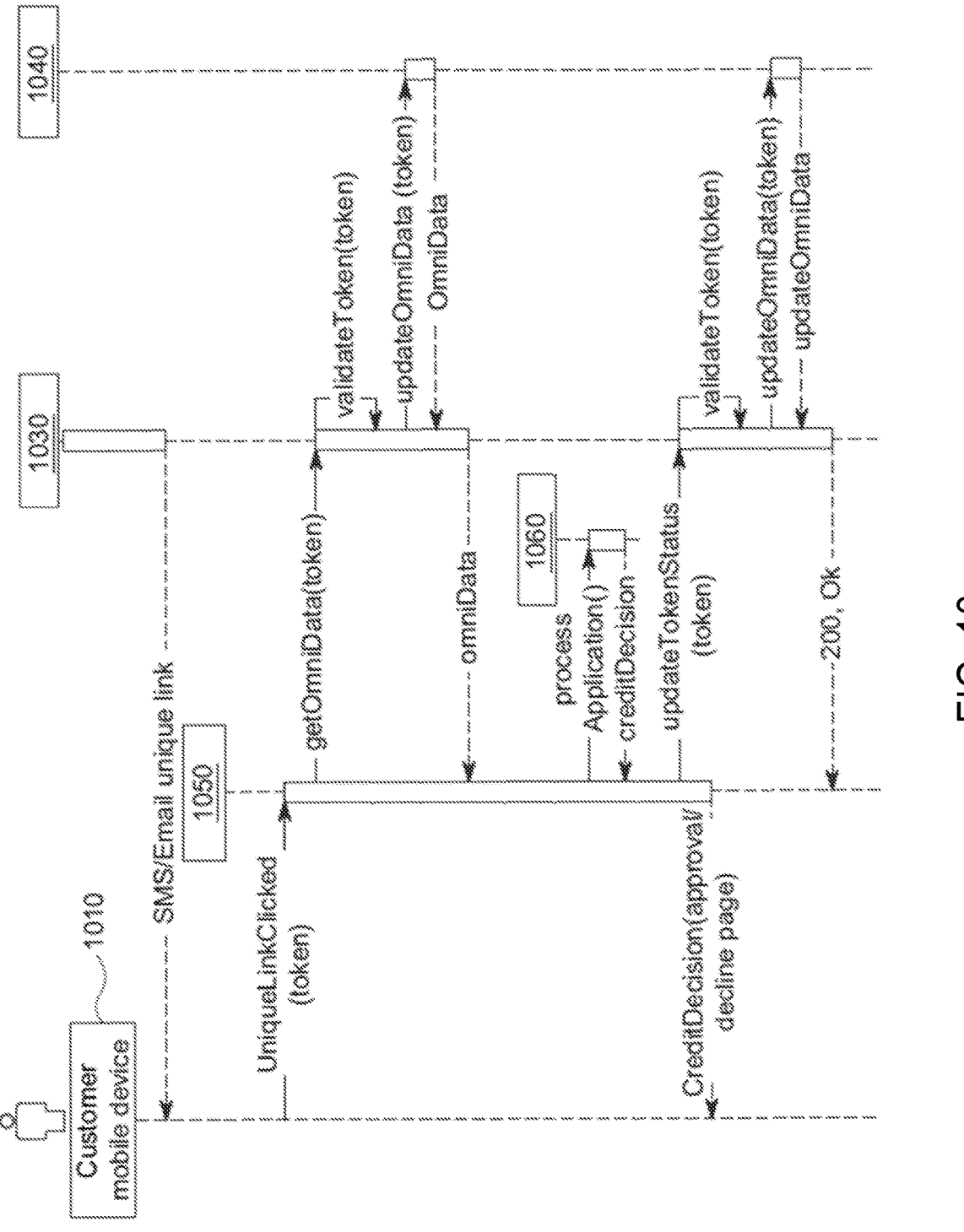
FIG. 10 shows illustrative aspects of a system for custom tender payments that can be used with a custom tender application in accordance with at least one example.

FIG. 10 then illustrates communications that can be part of a system similar to the system of described above. FIG. 10 includes a customer mobile device 1010, and authentication system 1030, data store system 1040, credit interface system 1050, and credit decision system 1060. As part of the communications illustrated by FIG. 10, authentication system 1030 communicates a secure one-time link to customer mobile device 1010. This secure one-time link can then be used by the customer mobile device 1010 to establish secure communications with credit system 1050. When the customer mobile device 010 uses the secure one-time link with credit system 1050, the credit interface system 1050 can communicate with authentication system 1030 and data store system 1040 to verify the security of the one-time link and establish the secure channel between the customer mobile device 1010 and the credit interface system 1050. After validation, the credit interface system 1050 can access the credit decision system 1060 using secure verified data to generate a decision in response to the request data. The secure communication channel established and verified using the authentication system 1030 and data store system 1040 can then be used to communicate the decision data to the customer mobile device 1010.

The various systems can be updated with information from the decision data for use with future communications with a client. This can include a record of the decision data and the request data, with portions of the data or related information kept in data store system 1040 for future use.

Figure 11:
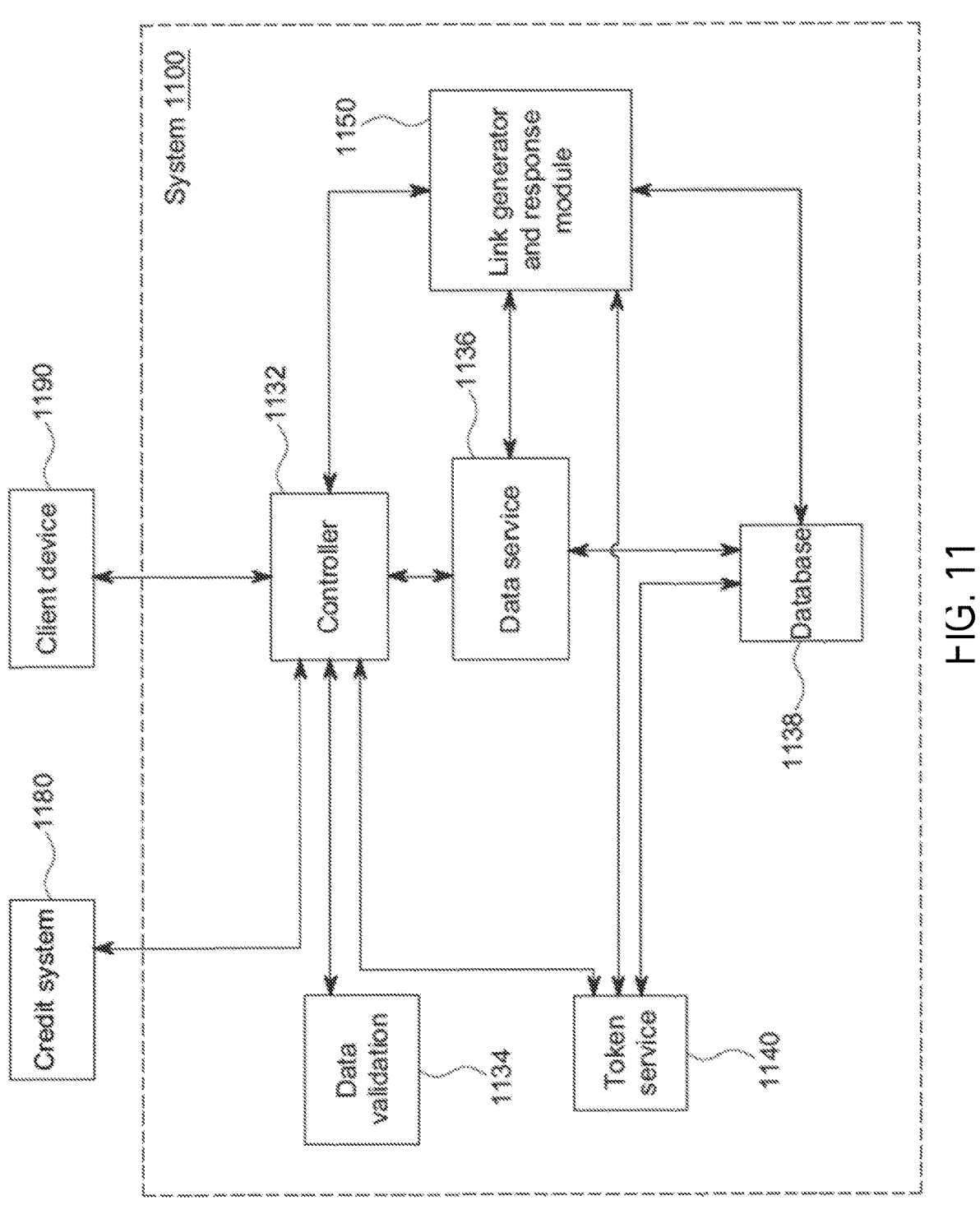
FIG. 11 shows illustrative aspects of a system for custom tender payments that can be used with a custom tender application in accordance with at least one example.

FIG. 11 illustrates an example of an authentication system 1100 in communication with a client device 1190 and a credit system 1180 in accordance with one possible implementation. In the illustrated system of FIG. 11, a client device 1190 can provide request data to the authentication system. A controller 1132 processes the incoming request data and accesses a request validation service in data validation 1134. If the request is validated, the controller 1132 initiates generation of a token using module 1150. Additional details of module 1150 are described below. Module 1150 provides a secure one-time link to controller 1132. At any point, either in parallel to or after generation of the secure one-time link, the controller can also initiate a data fetch using data service 1136. This can include any information for a service to be called in response to the request data. In some implementations, data from the data service can be used with the initiation of the generation of the token and the one-time link. In other implementations, the data from data service 1136 (e.g. using database 1138) can then be available for various services enabled by the secure one-time link and associated secure channels. The controller 1132 then initiates communication of the secure one-time line to the authorized recipient (e.g. either directly to a customer device or to the customer via a host, retail, or merchant system).

If the controller 1132 then receives an incoming communication using the secure one-time link, the controller 1132 accesses token service 1140 to verify the authenticity of the communication. This can include fetching data from module 1150 via data service 1136 and from the token service 1140. When the secure one-time link is verified, the token status is updated at token service 1140 to prevent the one-time link from being used again. The controller can then communicate with credit system 1180 to enable secure communications for decision making and facilitating a response to the request from the customer.

Figure 12:
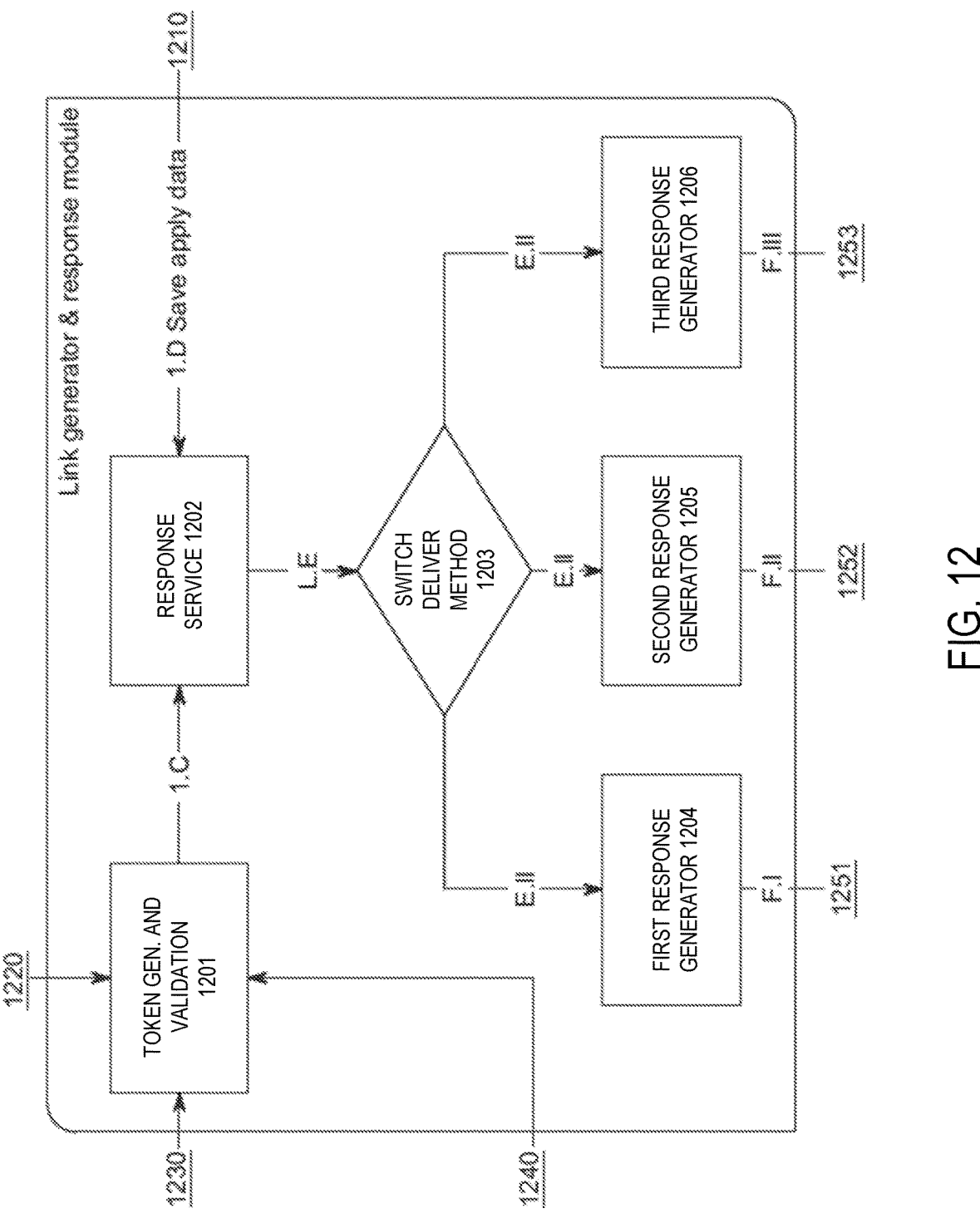
FIG. 12 shows illustrative aspects of a system for custom tender payments that can be used with a custom tender application in accordance with at least one example.

FIG. 12 describes an example implementation of a link generator and response module. While FIG. 12 shows one implementation, it will be apparent that other implementations are possible. The example of FIG. 12 includes a token generator and validator, a response service, and a communication channel selection system for selecting between different channel options for communication of a secure one-time link. The token generator and validator can have a connection 1220 to a controller such as controller 1132 to receive a communication initiating token and secure one-time link generation. The token generator and validator can also connect to data service 1136 and token service 1140 to allow verification of a received one-time link and an update to prevent the one-time link from being reused. The response service can communicate with the token generator and validator to store appropriate information in a database such as database 1138 for future verification and to prevent one-time link reuse.

For systems that allow different channels for communication of a one-time link to a customer, the link generator and response module includes circuitry for switching delivery methods. In the illustrated implementation of FIG. 12, switch delivery method includes circuitry to select between a communication channel for sending a one-time link to a customer via a merchant system, sending a one-time link to a customer directly via email, or sending a one-time link to a customer via SMS. Each delivery method can include different circuitry for generating appropriate secure communications in the selected channel with the secure one-time link. When the appropriate communication is generated, the controller can receive the information via the corresponding output 1251, 1252, or 1253 of the link generator and response module. The controller then routes the secure one-time link to the user via the selected delivery channel. In some implementations, the request data identifies the channel, and the channel is selected by parsing the request data. In other implementations, the link generator and response module selects from multiple available options based on data from a data service.

Figure 13:
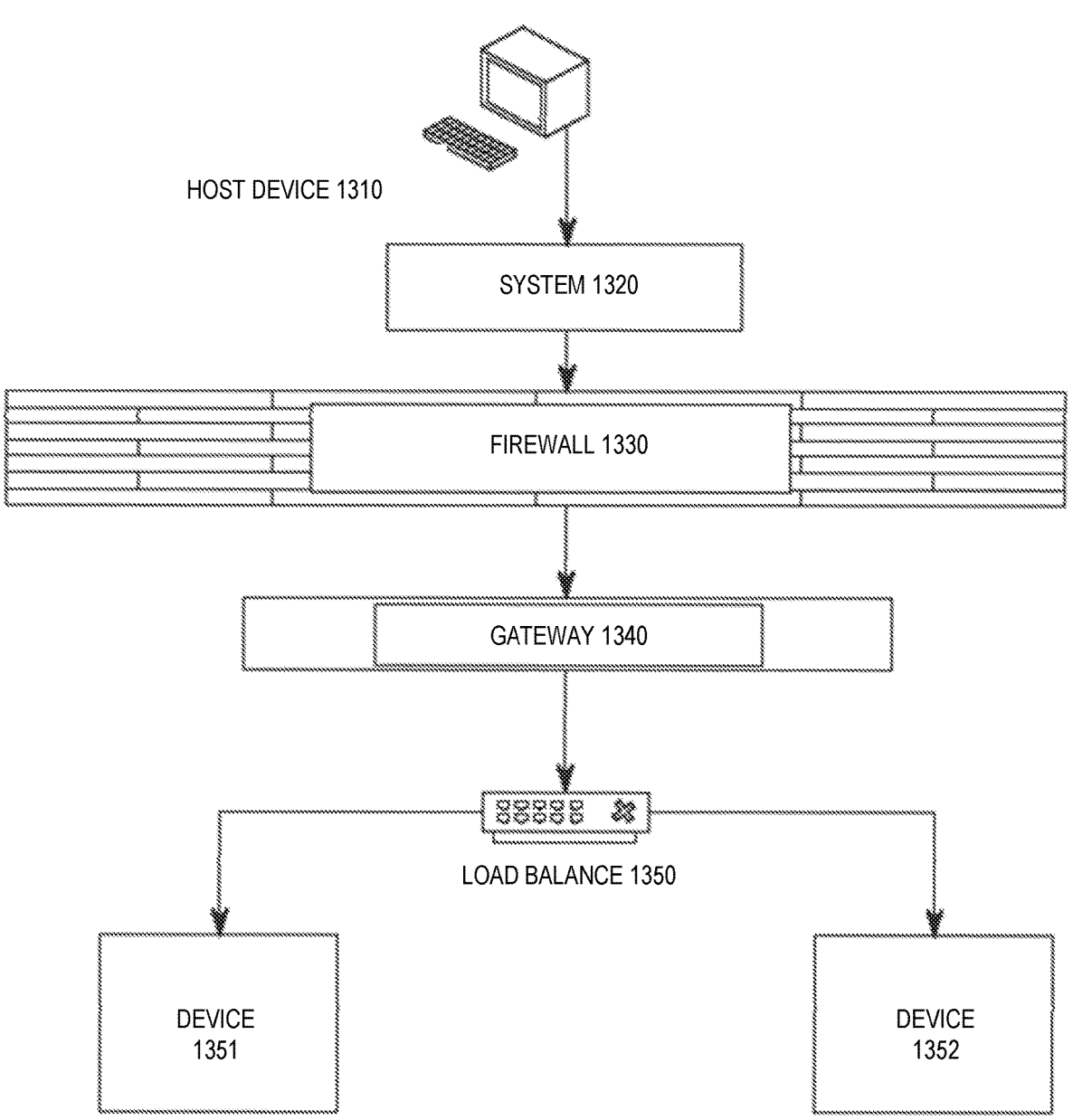
FIG. 13 shows illustrative aspects of a system for custom tender payments that can be used with a custom tender application in accordance with at least one example.

FIG. 13 illustrates additional aspects of network data management in accordance with at least one embodiment. FIG. 13 includes interface system 1320 (e.g. an interface system 920) for interacting with a host device 1310 (e.g. a retail computer system) and protecting an authentication system that can include system devices 1351 and 1352. In particular, for a data management system protecting secure data, interface system 1320 can be one layer in a multi-layer secure management system for allowing a retail system and customer devices, such as host device 1310, to communicate with secure data stored in the devices of the system, including system device 1351 and 1352. The interface system 1320 can thus be separated from system devices 1351 by a firewall system 1330, a gateway system 1340, and a load balancer system 1350. The interface device can provide tokens to devices such as host device 1310 to authorize communications. Such a token, however, may not provide sufficient protection, and firewall system 1330 can include additional protections, including analyzing incoming request for patterns of malicious attack or improper communications. Further, some systems can be configured for large numbers of requests, and so request data for high volumes and different distributions of geographic locations originating different requests can be managed by gateway system 1340 and load balancer system 1350, which can route request data to different system devices such as system device 1351 and system device 1352 based on incoming data and performance of different devices in a system.

FIG. 14 is a flow diagram illustrating an example method 1400. Method 1400 can be performed by one or more processors of a server computer or server system as part of an account security system (e.g. custom tender application 118). Method 1400 can, in some examples, be implemented as computer readable instructions that, when executed by processing circuitry of a device, cause the device to perform steps of method 1400.

Operation 1402 of method 1400 includes receiving, at a mobile device, a communication associated with a custom tender payment for a secure transaction payment, wherein the mobile device includes a custom payment application configured for the secure transaction payment with a point of sale (POS) device. The method 1400 describes the custom payment application interacting with a POS device to initiate independent verification via a mobile device, but in other implementations, the application can operate on a POS device, and can initiate independent interactions with a mobile device via the integration server as described above. The custom payment application can include interface elements for both a custom tender option and a standardized tender option. For example, FIG. 2 illustrates a standardized payment option, such as a manual or credit/debit payment option, as well as a custom tender UI element 220. Selection of such an element can initiate communications involving an integration system (e.g., the custom tender payment system 518 of FIGS. 5 and 6) in operations 1404 and 1406 as described below.

Operation 1404 of method 1400 includes receiving account data associated with a user account selection for the custom tender payment for the secure transaction payment. In some examples, such receipt can occur via a user input, such as via a touchscreen, a keyboard, a voice input, or other such inputs. In other implementations, secure storage can be accessed on the mobile device for secure user data stored in the secure storage of the user device.

Operation 1406 of method 1400 includes transmitting an account signal including the account data, wherein when the account signal is transmitted to an integration server as part of the secure transaction payment, the account signal is not transmitted to the POS device. Operation 1406 can involve a transmission from the mobile device to an integration server that is part of a custom tender payment system (e.g., the custom tender payment system 518) or any other such system for authorization independent of the mobile device.

Operation 1408 of method 1400 includes receiving an authorization communication, wherein when the authorization communication is received by the mobile device from the integration server, the authorization communication is not communicated to the mobile device via the POS device.

Operation 1410 of method 1400 includes facilitating presentation of the authorization communication on the POS device. Such operations can, for example, an individual customer on-site at a merchant location, where the merchant location includes a POS device, and the customer has a mobile device. In one implementation, the merchant POS system includes a custom tender UI element that allows an entry identifying a customer mobile device. The POS device can then send a communication associated with a custom tender payment for a secure transaction payment to the user device, or the POS can interact with an integration server to have the integration server send the communication to the customer mobile device. An interface or application on the customer mobile device can then allow selection or entry of account data associated with a user account selection for the custom tender payment to be used in the secure transaction. The account data is sent in an account signal to the integration server. The integration server authorizes the associated payment, and sends an authorization communication to the mobile device. The mobile device can then use the authorization communication with the POS device to finalize the transaction (e.g., by presenting a code, or other authorization indication on a display or output of the mobile device that can be scanned by the POS device). By sending the authorization to the mobile device, rather than the POS device, system security is improved by avoiding possible device-in-the-middle impersonations. Since the process involves signal passing in a loop from the POS to the integration server, from the integration server to the mobile device, and from the mobile device to the POS, rather than following an initial path and then an identical return path, security is improved. Additionally, since the merchant has control of the POS device, and can include security with the POS device verifying that the customer is on-site at the location of the POS device, additional authorization security is provided following the communication of the authorization communication to the mobile device, since the mobile device presents the authorization communication to the on-site merchant POS device.

In some implementations, the custom tender UI element of a POS device or a related responsive UI element of an interface or application of a mobile device can be used to initiate multiple combined functionality processes in response to a single UI input. For example, in some implementations, selection of a custom tender UI element can involve a single input that automatically performs functionality for both an authorization of payment process and an application for credit. Such single input multiple functionality can be used to improve the operation of a system by reducing the number of inputs needed to perform operations for custom tender use in a secure transaction. In some implementations, such options can be automatically selected by a user based on pre-selected transaction criteria. For example, a custom tender payment system can allow a customer to select a payment threshold that triggers single entry multiple functionality operations when the payment amount is above a given threshold. When a POS element receives a custom tender input associated with a customer device, or when a customer mobile device receives a communication associated with a custom tender payment having a transaction amount above a threshold, the customer selected settings (or system settings in other implementations), can be used to automatically initiate both a new credit request, and authorization associated with both existing credit, existing accounts, and/or the new credit account associated with the new credit request.

Further, such single action multiple functionality systems can be used to initiate other actions selectable by a customer, such as communication alerts, secondary security settings or authorization checks, independent verification of unique tokens via a customer selected verification method, or other such action.

In some implementations, a POS device can be used with such methods, where the POS device includes a display screen, with the POS device being configured to display on the screen a custom tender payment element, and additionally being configured to initiate a security communication to an integration server (e.g., the custom tender payment system 518), and to receive an indication of an authorization communication from a mobile device using one or more sensors of the POS device.

Similarly, in some implementations, a mobile device can be used, where the mobile device includes a display screen, with the display screen configured to display a custom tender payment element used to manage access to customer account data either stored on the mobile device or in a secure digital lockbox associated with an integration server. The custom tender payment element can be used for initiating availability of the data associated with a secure transaction to the integration server. The mobile device can then automatically display authorization information from an authorization communication, where when the authorization communication is received from the integration server, the display of the mobile device is used to present the authorization information to the POS device to facilitate the secure transaction.

In some implementations, the custom tender UI elements described above can be used for initiating simultaneous multiple functionality operations in response to a single user input, where both new account operations and authorization operations for existing accounts are simultaneously performed in response to a single user input or a single user action.

FIG. 15 is a flow diagram illustrating an example method 1500. Method 1500 can be performed by one or more processors of a server computer or server system as part of an account security system (e.g. custom tender application 118) subsequent to performance of the operations of method 1400. Method 1500 can, in some examples, be implemented as computer readable instructions that, when executed by processing circuitry of a device, cause the device to perform steps of method 1500.

Operation 1502 of method 1500 includes receiving a payment option communication including payment option data, wherein when the payment option communication is received, the payment option communication is associated with the integration server and the account signal.

Operation 1504 of method 1500 includes facilitating presentation of the payment option data. Presentation of payment option data can be performed using an interface of a POS device, an application operating on a user's device, or a combination of the two. Payment option data can include a custom tender option (e.g., using a network or system outside of a standardized system for a POS device), or using a standardized payment tender option. In some implementations, the standardized payment tender option is a default option. The default option can be presented with a larger interface element, or with indications that the default option is a preferred or standardized option. Another interface element can indicate that other options, including custom tender options or new account application with corresponding tender options if a new account is approved, are available. Additional aspects of such presentation are discussed above, for example, with respect to FIG. 2.

Operation 1506 of method 1500 includes receiving a payment selection, wherein the payment selection includes an indication of a selected option from the payment option data. Receipt of such a selection can involve a user input to a device via a keyboard, a touchscreen, a voice command, or other such device inputs for providing selections via a user interface.

Operation 1508 of method 1500 includes transmitting the payment selection, where the authorization communication payment selection, where the authorization communication is received after transmitting the payment selection. In some aspects, the transmission is dynamically routed based on the specific details of the selection. For example, a custom tender selection can be routed through a custom tender payment system (e.g., system 518) with associated security authentication that then occurs independent of a POS system (e.g., system 510). Similarly, a standardized tender selection can involve a separate interaction with a different system than the custom tender payment system, so that an application and/or POS system as described herein can support multiple tender options, including at least a standardized option and a custom tender option that uses secure communications as described above (e.g., independent of the POS system). In some implementations, the operations above can include further operations for both custom and standardized tender options, such as operations for receiving, at the mobile device, a communication associated with a standardized tender payment using the custom payment application, receiving second account data associated with a second user account selection for the standardized tender payment, and facilitating the standardized tender payment using the custom payment application. Systems for secure POS operations can thus facilitate custom tender operations for a large group of users while simultaneously facilitating standardized options for other users. Such systems can simultaneously process communications and operations for thousands of users at the same time, in a variety of different forms, based on the dynamic selections received from the various simultaneous users.

In other aspects, other operations or specific structures can be used for secure POS operations For example, in one implementation, the operations of methods 1400 or 1500 can further involve operations for receiving a disclosure communication associated with the payment selection, facilitating presentation of the disclosure communication on a display device of the mobile device, receiving an acceptance input indicating an acceptance of terms of the disclosure communication, and transmitting an acceptance communication based on the acceptance input. Such operations can be performed such that, when the authorization communication is received, the authorization communication is associated with the acceptance communication.

In further aspects, the operations described above can be performed such that the authorization communication indicates that the custom tender payment is not approved. Such an indication is received by a POS device or a custom tender application, alternate options can be presented, such as a standardized tender option, a physical tender option, a layaway (e.g., item record creation for a later transaction), or other such options. In some operations, the authorization communication indicates that the custom tender payment is approved, and the system can then facilitate confirmation and completion of the secure transaction payment.

In some aspects of the methods above, the communication associated with the custom tender payment is generated by a payment application executed in a mobile operating system environment on the POS device.

In some aspects of the methods above, the operations may further involve receiving a new account application input, wherein when the new account application input is received at the mobile device, the new account application input is associated with the communication for the custom tender payment, transmitting the new account application input, receiving a unique tokenized uniform resource locator (URL), and facilitating an application interaction using the unique tokenized URL, where the account data associated with the user account selection is received based on the application interaction. In some such systems, tokenization for a custom tender system may be integrated with custom tender functions in a single server system, or can be implemented by a separate token service. In some implementations, a secure token service may be combined with a secure digital lockbox system that uses authentication to provide a custom tender application with access to previously stored or other secure user data. Such secure user data can be used for authenticating a user account, requesting a new account for a user, generating prefill information that can be used as part of a new account request, or for any other such purpose authorized by a user. Secure information stored in a secure digital lockbox can include account details for a user's existing accounts, address information, identifier or user identification details (e.g., photographs of licensing documents, passport documents, or other such identifying information), contact information and authorizations (e.g., for phone numbers) or other secure personal information that may be subject to various security concerns and/or privacy regulations. In some implementations, such systems can be integrated with operations above to include additional operations such as accessing secure user data from a secure digital lockbox system using the new account application, receiving a dynamically generated secure token and autofill information for the new account application input, and facilitating an application interaction using the secure token an the autofill information.

Methods 1400 and 1500 above, as well as the additional descriptions herein, illustrate example operations. Any such methods or implementations described herein can further include repeated or intervening operations, while remaining within the description of the innovations provided herein. Additionally, the described computing systems can perform many simultaneous operations in support of such interactions at the same time. For example, the methods above can further involve simultaneously processing, by the integration server, the custom tender payment, at the same time that the integration server is processing a plurality of standardized tender payments and custom tender payments for a plurality of additional mobile devices associated with a plurality of user accounts. Such simultaneous operations can be performed by distributed servers or server systems with any number of processors and computing resources, including systems dynamically allocatable in response to the number of simultaneous operations being requested by a system.

In some implementations, the system can analyze details of the secure transaction to actively recommend a custom tender payment option for enhanced security where authorization is not communicated directly back to a POS device based on the details of the secure transaction, or recommend a lower security standardized payment option when warranted by the details of the secure transaction. In such an implementation, the POS and/or the mobile device can use data such as location data, account activity data, third party security data related to fraudulent transactions, or other such data to actively recommend between a custom tender payment option and a standardized tender payment option. Such an analysis can particularly review history data for fraudulent transaction attempts that would be possible in a standard payment authorization where the authorization request is sent directly to the POS device, but where the structure of the historical fraudulent transaction attempts would not be possible (e.g., due to a bad actor device not being able to intercept communications) in a custom tender payment where the authorization is initially sent to the mobile device without being transmitted to the POS device, so that the mobile device can be used to present the authorization data to the POS device.

Figure 16:
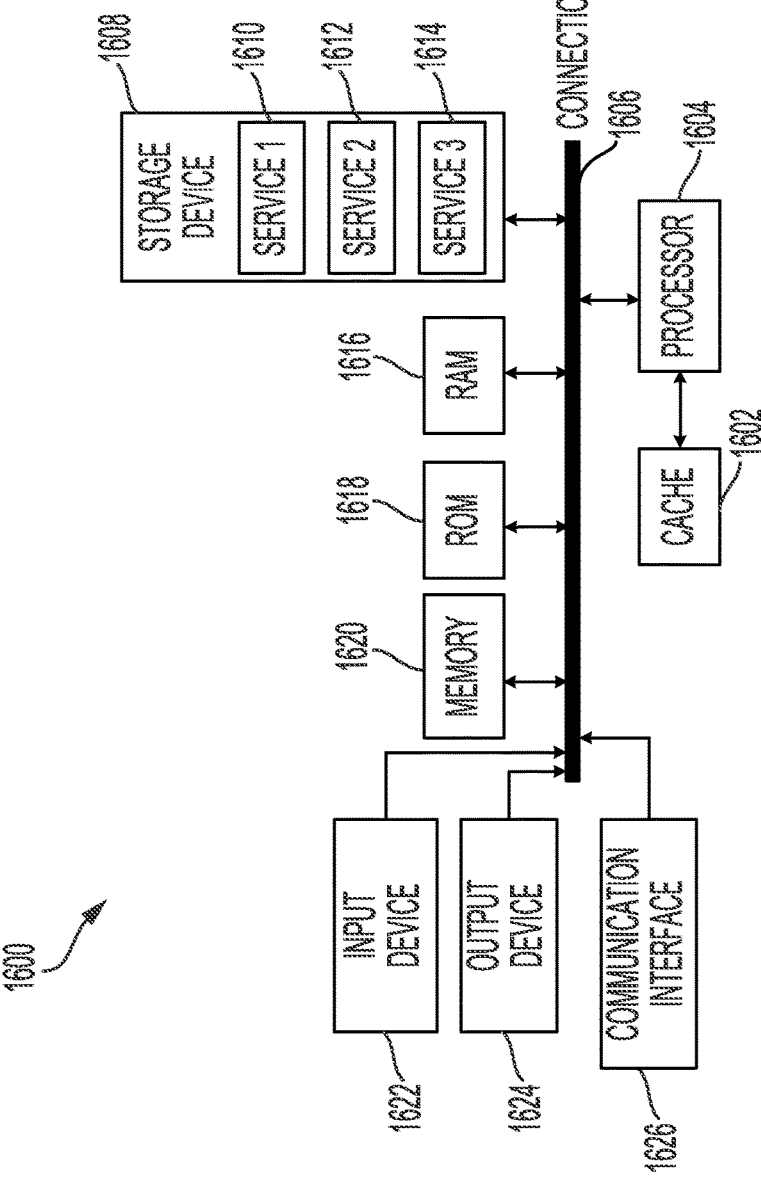
FIG. 16 shows a computing system architecture including various components in electrical communication with each other using a connection in accordance with various examples.

FIG. 16 shows a computing system architecture including various components in electrical communication with each other using a connection in accordance with various examples. FIG. 16 illustrates a computing system architecture 1600 including various components in electrical communication with each other using a connection 1606, such as a bus, in accordance with some implementations. Example system architecture 1600 includes a processing unit (CPU or processor) 1604 and a system connection 1606 that couples various system components including the system memory 1620, such as ROM 1618 and RAM 1616, to the processor 1604. The system architecture 1600 can include a cache 1602 of high-speed memory connected directly with, in close proximity to, or integrated as part of the processor 1604. The system architecture 1600 can copy data from the memory 1620 and/or the storage device 1608 to the cache 1602 for quick access by the processor 1604. In this way, the cache can provide a performance boost that avoids processor 1604 delays while waiting for data. These and other modules can control or be configured to control the processor 1604 to perform various actions.

Other system memory 1620 may be available for use as well. The memory 1620 can include multiple different types of memory with different performance characteristics. The processor 1604 can include any general purpose processor and a hardware or software service, such as service 1 1610, service 2 1612, and service 3 1614 stored in storage device 1608, configured to control the processor 1604 as well as a special-purpose processor where software instructions are incorporated into the actual processor design. The processor 1604 may be a completely self-contained computing system, containing multiple cores or processors, a bus, memory controller, cache, etc. A multi-core processor may be symmetric or asymmetric.

To enable user interaction with the computing system architecture 1600, an input device 1622 can represent any number of input mechanisms, such as a microphone for speech, a touch-sensitive screen for gesture or graphical input, keyboard, mouse, motion input, speech and so forth. An output device 1624 can also be one or more of a number of output mechanisms known to those of skill in the art. In some instances, multimodal systems can enable a user to provide multiple types of input to communicate with the computing system architecture 1600. The communications interface 1626 can generally govern and manage the user input and system output. There is no restriction on operating on any particular hardware arrangement and therefore the basic features here may easily be substituted for improved hardware or firmware arrangements as they are developed.

Storage device 1608 is a non-volatile memory and can be a hard disk or other types of computer readable media which can store data that are accessible by a computer, such as magnetic cassettes, flash memory cards, solid state memory devices, digital versatile disks, cartridges, RAMs 1616, ROM 1618, and hybrids thereof.

The storage device 1608 can include services 1610, 1612, 1614 for controlling the processor 1604. Other hardware or software modules are contemplated. The storage device 1608 can be connected to the system connection 1606. In one aspect, a hardware module that performs a particular function can include the software component stored in a computer-readable medium in connection with the necessary hardware components, such as the processor 1604, connection 1606, output device 1624, and so forth, to carry out the function.

The disclosed systems can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor. The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDNO modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the LinuxTM operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the terms "computer readable medium", "computer readable storage medium", "machine-readable medium" and "machine-readable storage medium" should be taken to include a single medium or multiple media (e.g., a centralized or distributed database, and/or associated caches and servers) that store the one or more sets of instructions. The terms "computer readable medium", "computer readable storage medium", "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a keypad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:

dynamically synchronizing a custom payment application for securing a transaction payment with a POS device, wherein the custom payment application includes a user interface on a mobile device;

dynamically selecting and performing a security operation in real-time on the mobile device using transaction information as the transaction information is being received;

identifying a product being purchased and user data associated with a user purchasing the product;

updating and customizing the user interface according to the security operation, wherein the updated user interface concurrently includes a selectable payment option presented as an interactive option on the POS device and a selectable custom tender payment option that is not presented as an option on the POS device, wherein the selectable payment option is available for purchasing the product, wherein the selectable custom tender payment option is customized according to the product and the user data, wherein the selectable custom tender payment option is a secure payment option according to the security operation, and wherein the selectable custom tender payment option includes a customized credit offer;

receiving, at the mobile device, a communication associated with an acceptance of the customized credit offer for the transaction payment, wherein when the communication is received from the POS device, the communication is generated by a payment application on the POS device;

receiving an authorization communication, wherein when the authorization communication is received by the mobile device from an integration server, the authorization communication is not communicated to the mobile device via the POS device, and wherein the authorization communication includes a code; and facilitating presentation of the authorization communication on the POS device for a custom tender payment, wherein the code is configured to be scanned by the POS device.

2. The computer-implemented method of claim 1, further comprising:

receiving a payment option communication including payment option data, wherein when the payment option communication is received, the payment option communication is associated with the integration server and an account signal; and facilitating presentation of the payment option data.

3. The computer-implemented method of claim 1, further comprising:

receiving a disclosure communication associated with a payment selection; and facilitating presentation of the disclosure communication on a display device of the mobile device.

4. The computer-implemented method of claim 1, wherein the authorization communication indicates that the custom tender payment is not approved.

5. The computer-implemented method of claim 1, further comprising:

facilitate confirmation and completion of the transaction payment, wherein the authorization communication indicates that the custom tender payment is approved.

6. The computer-implemented method of claim 1, further comprising:

receiving a new account application input, wherein when the new account application input is received at the mobile device, the new account application input is associated with the communication for the custom tender payment; and transmitting the new account application input.

7. The computer-implemented method of claim 1, further comprising:

accessing secure user data from a secure digital lockbox system using account data;

receiving a dynamically generated secure token and autofill information for a new account application input; and facilitating an application interaction using the dynamically generated secure token and the autofill information.

8. The computer-implemented method of claim 1, further comprising:

simultaneously processing, by the integration server, the custom tender payment, while the integration server is processing a plurality of standardized tender payments and custom tender payments for a plurality of additional mobile devices associated with a plurality of user accounts.

9. The computer-implemented method of claim 1, further comprising:

receiving, at the mobile device, a communication associated with a standardized tender payment using the custom payment application;

receiving second account data associated with a second user account selection for the standardized tender payment; and facilitating the standardized tender payment using the custom payment application.

10. A mobile device, comprising:

a memory; and one or more processors coupled to the memory and configured to perform operations comprising:

dynamically synchronizing a custom payment application for securing a transaction payment with a POS device, wherein the custom payment application includes a user interface on a mobile device;

dynamically selecting and performing a security operation in real-time on the mobile device using transaction information as the transaction information is being received;

identifying a product being purchased and user data associated with a user purchasing the product;

updating and customizing the user interface according to the security operation, wherein the updated user interface concurrently includes a selectable payment option presented as an interactive option on the POS device and a selectable custom tender payment option that is not presented as an option on the POS device, wherein the selectable payment option is available for purchasing the product, wherein the selectable custom tender payment option is customized according to the product and the user data, wherein the selectable custom tender payment option is a secure payment option according to the security operation, and wherein the selectable custom tender payment option includes a customized credit offer;

receiving, at the mobile device, a communication associated with an acceptance of the customized credit offer for the transaction payment, wherein when the communication is received from the POS device, the communication is generated by a payment application on the POS device;

receiving an authorization communication, wherein when the authorization communication is received by the mobile device from an integration server, the authorization communication is not communicated to the mobile device via the POS device, and wherein the authorization communication includes a code; and facilitating presentation of the authorization communication on the POS device for a custom tender payment, wherein the code is configured to be scanned by the POS device.

11. The mobile device of claim 10, wherein the one or more processors are further configured to perform operations comprising:

receiving a payment option communication including payment option data, wherein when the payment option communication is received, the payment option communication is associated with the integration server and an account signal; and facilitating presentation of the payment option data.

12. The mobile device of claim 10, wherein the one or more processors are further configured to perform operations comprising:

receiving a disclosure communication associated with a payment selection; and facilitating presentation of the disclosure communication on a display device of the mobile device.

13. The mobile device of claim 10, wherein the authorization communication indicates that the custom tender payment is not approved.

14. The mobile device of claim 10, wherein the one or more processors are further configured to perform operations comprising:

facilitating confirmation and completion of the transaction payment, wherein the authorization communication indicates that the custom tender payment is approved.

15. The mobile device of claim 10, wherein the one or more processors are further configured to perform operations comprising:

receiving a new account application input, wherein when the new account application input is received at the mobile device, the new account application input is associated with the communication for the custom tender payment; and transmitting the new account application input.

16. The mobile device of claim 10, wherein the one or more processors are further configured to perform operations comprising:

accessing secure user data from a secure digital lockbox system using account data;

receiving a dynamically generated secure token and autofill information for a new account application input; and facilitating an application interaction using the dynamically generated secure token and the autofill information.

17. The mobile device of claim 10, wherein the one or more processors are further configured to perform operations comprising:

simultaneously processing, by the integration server, the custom tender payment, while the integration server is processing a plurality of standardized tender payments and custom tender payments for a plurality of additional mobile devices associated with a plurality of user accounts.

18. The mobile device of claim 10, wherein the one or more processors are further configured to perform operations comprising:

receiving, at the mobile device, a communication associated with a standardized tender payment using the custom payment application;

receiving second account data associated with a second user account selection for the standardized tender payment; and facilitating the standardized tender payment using the custom payment application.

19. A non-transitory computer readable medium comprising instructions that, when executed by one or more processors of a mobile device, cause the mobile device to perform operations, comprising:

dynamically synchronizing a custom payment application for securing a transaction payment with a POS device, the custom payment application includes a user interface on a mobile device;

dynamically selecting and performing a security operation in real-time on the mobile device using transaction information as the transaction information is being received;

identifying a product being purchased and user data associated with a user purchasing the product;

updating and customizing the user interface according to the security operation, wherein the updated user interface concurrently includes a selectable payment option presented as an interactive option on the POS device and a selectable custom tender payment option that is not presented as an option on the POS device, wherein the selectable payment option is available for purchasing the product, wherein the selectable custom tender payment option is customized according to the product and the user data, wherein the selectable custom tender payment option is a secure payment option according to the security operation, and wherein the selectable custom tender payment option includes a customized credit offer;

receiving, at the mobile device, a communication associated with an acceptance of the customized credit offer for the transaction payment, wherein when the communication is received from the POS device, the communication is generated by a payment application on the POS device;

receiving an authorization communication, wherein when the authorization communication is received by the mobile device from an integration server, the authorization communication is not communicated to the mobile device via the POS device, and wherein the authorization communication includes a code; and facilitating presentation of the authorization communication on the POS device, wherein the code is configured to be scanned by the POS device.

20. The non-transitory computer readable medium of claim 19, wherein the instructions further cause the mobile device to perform operations comprising:

receiving a payment option communication including payment option data, wherein when the payment option communication is received, the payment option communication is associated with the integration server and an account signal; and facilitating presentation of the payment option data.

21. The non-transitory computer readable medium of claim 19, wherein the instructions further cause the mobile device to perform operations comprising:

receiving a disclosure communication associated with a payment selection; and facilitating presentation of the disclosure communication on a display device of the mobile device.

22. The non-transitory computer readable medium of claim 19, wherein the authorization communication indicates that the selectable custom tender payment option is not approved.

23. The non-transitory computer readable medium of claim 19, wherein the instructions further cause the mobile device to perform operations comprising:

facilitating confirmation and completion of the transaction payment, wherein the authorization communication indicates that the selectable custom tender payment option is approved.

24. The non-transitory computer readable medium of claim 19, wherein the instructions further cause the mobile device to perform operations comprising:

receiving a new account application input, wherein when the new account application input is received at the mobile device, the new account application input is associated with the communication for the selectable custom tender payment option; and transmitting the new account application input.

25. The non-transitory computer readable medium of claim 19, wherein the instructions further cause the mobile device to perform operations comprising:

accessing secure user data from a secure digital lockbox system using account data;

receiving a dynamically generated secure token and auto-fill information for a new account application input; and facilitating an application interaction using the dynamically generated secure token and the autofill information.

26. The non-transitory computer readable medium of claim 19, wherein the instructions further cause the mobile device to perform operations comprising:

simultaneously processing, by the integration server, the selectable custom tender payment option, while the integration server is processing a plurality of standardized tender payments and custom tender payments for a plurality of additional mobile devices associated with a plurality of user accounts.

27. The non-transitory computer readable medium of claim 19, wherein the instructions further cause the mobile device to perform operations comprising:

receiving, at the mobile device, a communication associated with a standardized tender payment using the custom payment application;

receiving second account data associated with a second user account selection for the standardized tender payment; and facilitating the standardized tender payment using the custom payment application.

28. The computer-implemented method of claim 1, further comprising:

transmitting an account signal including account data, wherein when the account signal is transmitted to an integration server as part of the transaction payment, the account signal is not transmitted to the POS device.

29. The computer-implemented method of claim 1, further comprising:

receiving a payment selection, wherein the payment selection includes an indication of a selected option from payment option data; and transmitting the payment selection; where the authorization communication is received after transmitting the payment selection.

30. The computer-implemented method of claim 1, further comprising:

receiving an acceptance input indicating an acceptance of terms of a disclosure communication; and transmitting an acceptance communication based on the acceptance input;

wherein when the authorization communication is received, the authorization communication is associated with the acceptance communication.

31. The computer-implemented method of claim 1, further comprising:

receiving a unique tokenized uniform resource locator (URL); and facilitating an application interaction using the unique tokenized URL;

wherein account data associated with a user account selection is received based on the application interaction.

32. The computer-implemented method of claim 1, further comprising receiving an input selection to apply for credit and accepting sensitive user data that is kept separate from a merchant system.

* * * * *